US007614953B2

(12) United States Patent
Souza et al.

(10) Patent No.: US 7,614,953 B2
(45) **Date of Patent: *Nov. 10, 2009**

(54) GAMING DEVICE HAVING MULTIPLE INTERRELATED SECONDARY GAMES

(75) Inventors: Roman A. Souza, Reno, NV (US); Randall D. Mead, Reno, NV (US); William E. Vorias, Las Vegas, NV (US)

(73) Assignee: IGT, Reno, NV (US)

( * ) Notice: Subject to any disclaimer, the term of this patent is extended or adjusted under 35 U.S.C. 154(b) by 137 days.

This patent is subject to a terminal disclaimer.

(21) Appl. No.: 11/868,750

(22) Filed: Oct. 8, 2007

(65) Prior Publication Data

US 2008/0026840 A1 Jan. 31, 2008

Related U.S. Application Data

(63) Continuation of application No. 10/657,559, filed on Sep. 8, 2003, now Pat. No. 7,278,919.

(51) Int. Cl.
*G06F 17/00* (2006.01)
*G06F 19/00* (2006.01)

(52) U.S. Cl. ............................ 463/20; 463/16; 463/17; 463/18; 463/19; 463/25; 463/29; 463/42; 273/138.1

(58) Field of Classification Search ............ 463/16–20, 463/25, 29, 42; 273/138.1
See application file for complete search history.

(56) References Cited

U.S. PATENT DOCUMENTS

| | | | |
|---|---|---|---|
| 1,527,929 | A | 2/1925 | Simons |
| 3,642,287 | A | 2/1972 | Lally et al. |
| 4,327,919 | A | 5/1982 | Vennor |
| 4,448,419 | A | 5/1984 | Telnaes |
| 4,508,357 | A | 4/1985 | Reich |
| 4,560,161 | A | 12/1985 | Hamano |
| 4,582,324 | A | 4/1986 | Koza et al. |
| 4,624,459 | A | 11/1986 | Kaufman |

(Continued)

FOREIGN PATENT DOCUMENTS

| | | |
|---|---|---|
| DE | 197 06 286 | 5/1998 |

(Continued)

OTHER PUBLICATIONS

Addams Family Advertisement written by IGT, published in 2001.

(Continued)

*Primary Examiner*—Peter DungBa Vo
*Assistant Examiner*—Milap Shah
(74) *Attorney, Agent, or Firm*—K & L Gates LLP

(57) ABSTRACT

A gaming device and a method for operating the gaming device including interrelating bonus games in a bonus round by providing outcomes which transfer the player to one of the other interrelated bonus games. Each bonus game includes a different set of outcomes depending on what order the bonus game is selected by the gaming device or the player. Once an initial bonus game is selected, the player is presented with a plurality of selections which can include awards, award digits, modifiers, terminators, and other outcomes in addition to transfers to other bonus games.

19 Claims, 21 Drawing Sheets

U.S. PATENT DOCUMENTS

| | | | |
|---|---|---|---|
| 4,695,053 | A | 9/1987 | Vazquez, Jr. et al. |
| 4,836,546 | A | 6/1989 | DiRe |
| 4,991,848 | A | 2/1991 | Greenwood et al. |
| 5,034,807 | A | 7/1991 | Van kohorn |
| 5,102,134 | A | 4/1992 | Smyth |
| 5,152,529 | A | 10/1992 | Okada |
| 5,178,390 | A | 1/1993 | Okada |
| 5,205,555 | A | 4/1993 | Humano |
| 5,342,047 | A | 8/1994 | Heidel et al. |
| 5,393,057 | A | 2/1995 | Marnell, II |
| 5,407,200 | A | 4/1995 | Zalabah |
| 5,456,465 | A | 10/1995 | Durham |
| 5,524,888 | A | 6/1996 | Heidel |
| 5,536,016 | A | 7/1996 | Thompson |
| 5,542,669 | A | 8/1996 | Charron et al. |
| 5,560,603 | A | 10/1996 | Seelig et al. |
| 5,584,763 | A | 12/1996 | Kelly et al. |
| 5,611,535 | A | 3/1997 | Tiberio |
| 5,664,998 | A | 9/1997 | Seelig et al. |
| 5,711,525 | A | 1/1998 | Breeding |
| 5,769,716 | A | 6/1998 | Saffari et al. |
| 5,772,509 | A | 6/1998 | Weiss |
| 5,775,692 | A | 7/1998 | Watts et al. |
| 5,788,573 | A | 8/1998 | Baerlocher et al. |
| 5,823,874 | A | 10/1998 | Adams |
| 5,833,538 | A | 11/1998 | Weiss |
| 5,848,932 | A | 12/1998 | Adams |
| 5,851,148 | A | 12/1998 | Brune et al. |
| 5,873,781 | A | 2/1999 | Keane |
| 5,882,261 | A | 3/1999 | Adams |
| 5,890,962 | A | 4/1999 | Takemoto |
| 5,890,963 | A | 4/1999 | Yen |
| 5,902,184 | A | 5/1999 | Bennett |
| 5,911,418 | A | 6/1999 | Adams |
| 5,919,088 | A | 7/1999 | Weiss |
| 5,927,714 | A | 7/1999 | Kaplan |
| 5,941,770 | A | 8/1999 | Miers et al. |
| 5,944,314 | A | 8/1999 | Stavinsky |
| 5,947,820 | A | 9/1999 | Morro et al. |
| 5,951,397 | A | 9/1999 | Dickinson |
| 5,964,463 | A | 10/1999 | Moore, Jr. |
| 5,967,894 | A | 10/1999 | Kinoshita et al. |
| 5,976,015 | A | 11/1999 | Seelig et al. |
| 5,980,384 | A | 11/1999 | Barrie |
| 5,984,781 | A | 11/1999 | Sunaga |
| 5,997,400 | A | 12/1999 | Seelig et al. |
| 5,997,401 | A | 12/1999 | Crawford |
| 6,004,207 | A | 12/1999 | Wilson, Jr. et al. |
| 6,012,982 | A | 1/2000 | Piechowiak et al. |
| 6,015,346 | A | 1/2000 | Bennett |
| 6,019,369 | A | 2/2000 | Nakagawa et al. |
| 6,033,307 | A | 3/2000 | Vancura |
| 6,056,642 | A | 5/2000 | Bennett |
| 6,059,289 | A | 5/2000 | Vancura |
| 6,059,658 | A | 5/2000 | Mangano et al. |
| 6,062,980 | A | 5/2000 | Luciano |
| 6,086,066 | A | 7/2000 | Takeuchi et al. |
| 6,089,976 | A | 7/2000 | Schneider et al. |
| 6,089,977 | A | 7/2000 | Bennett |
| 6,089,978 | A | 7/2000 | Adams |
| 6,093,102 | A | 7/2000 | Bennett |
| 6,102,798 | A | 8/2000 | Bennett |
| 6,120,031 | A | 9/2000 | Adams |
| 6,126,541 | A | 10/2000 | Fuchs |
| 6,126,542 | A | 10/2000 | Fier |
| 6,135,882 | A | 10/2000 | Kadlic |
| 6,135,885 | A | 10/2000 | Lermusiaux |
| 6,142,873 | A | 11/2000 | Weiss et al. |
| 6,142,874 | A | 11/2000 | Kodachi et al. |
| 6,142,875 | A | 11/2000 | Kodachi et al. |
| 6,146,271 | A | 11/2000 | Kadlic |
| 6,149,156 | A | 11/2000 | Feola |
| 6,149,157 | A | 11/2000 | Suan |
| 6,155,925 | A | 12/2000 | Giobbi et al. |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,162,121 | A | 12/2000 | Morro et al. |
| 6,164,652 | A | 12/2000 | Lauretta et al. |
| 6,168,520 | B1 | 1/2001 | Baerlocher et al. |
| 6,168,523 | B1 | 1/2001 | Piechowiak et al. |
| 6,173,955 | B1 | 1/2001 | Perrie et al. |
| 6,174,233 | B1 | 1/2001 | Sunaga et al. |
| 6,174,234 | B1 | 1/2001 | Seibert, Jr. et al. |
| 6,174,235 | B1 | 1/2001 | Walker et al. |
| 6,179,711 | B1 | 1/2001 | Yoseloff |
| 6,186,894 | B1 | 2/2001 | Mayeroff |
| 6,190,254 | B1 | 2/2001 | Bennett |
| 6,190,255 | B1 | 2/2001 | Thomas et al. |
| 6,203,429 | B1 | 3/2001 | Demar et al. |
| 6,210,279 | B1 | 4/2001 | Dickinson |
| 6,213,876 | B1 | 4/2001 | Moore, Jr. |
| 6,224,483 | B1 | 5/2001 | Mayeroff |
| 6,231,442 | B1 | 5/2001 | Mayeroff |
| 6,231,445 | B1 | 5/2001 | Acres |
| 6,234,897 | B1 | 5/2001 | Frohm et al. |
| 6,238,288 | B1 | 5/2001 | Walker et al. |
| 6,277,969 | B1 | 5/2001 | Yoseloff |
| 6,261,177 | B1 | 7/2001 | Bennett |
| 6,283,855 | B1 | 9/2001 | Bingham |
| 6,302,790 | B1 | 10/2001 | Brossard |
| 6,305,686 | B1 | 10/2001 | Perrie et al. |
| 6,309,299 | B1 | 10/2001 | Weiss |
| 6,309,300 | B1 | 10/2001 | Glavich |
| 6,312,334 | B1 | 11/2001 | Yoseloff |
| 6,315,664 | B1 | 11/2001 | Baerlocher et al. |
| 6,319,124 | B1 | 11/2001 | Baerlocher et al. |
| 6,328,649 | B1 | 12/2001 | Randall et al. |
| 6,334,613 | B1 | 1/2002 | Yoseloff |
| 6,343,988 | B1 | 2/2002 | Walker et al. |
| 6,346,043 | B1 | 2/2002 | Colin et al. |
| 6,347,996 | B1 | 2/2002 | Gilmore et al. |
| 6,364,766 | B1 | 4/2002 | Anderson et al. |
| 6,375,187 | B1 | 4/2002 | Baerlocher |
| 6,375,567 | B1 | 4/2002 | Acres |
| 6,398,644 | B1 | 6/2002 | Perrie et al. |
| 6,406,369 | B1 | 6/2002 | Baerlocher et al. |
| 6,409,172 | B1 * | 6/2002 | Vancura ...................... 273/256 |
| 6,413,160 | B1 | 7/2002 | Vancura |
| 6,439,995 | B1 | 8/2002 | Hughes-Baird et al. |
| 6,443,837 | B1 | 9/2002 | Jaffe et al. |
| 6,454,651 | B1 | 9/2002 | Yoseloff |
| 6,461,241 | B1 | 10/2002 | Webb et al. |
| 6,464,582 | B1 | 10/2002 | Baerlocher et al. |
| 6,494,785 | B1 | 12/2002 | Gerrard et al. |
| 6,506,117 | B2 | 1/2003 | DeMar et al. |
| 6,506,118 | B1 | 1/2003 | Baerlocher et al. |
| 6,511,375 | B1 | 1/2003 | Kaminkow |
| 6,514,141 | B1 | 2/2003 | Kaminkow et al. |
| 6,537,150 | B1 * | 3/2003 | Luciano et al. ............... 463/16 |
| 6,565,436 | B1 | 5/2003 | Baerlocher |
| 6,569,013 | B1 | 5/2003 | Taylor |
| 6,569,015 | B1 | 5/2003 | Baerlocher et al. |
| 6,575,830 | B2 | 6/2003 | Baerlocher et al. |
| 6,582,307 | B2 | 6/2003 | Webb |
| 6,589,114 | B2 | 7/2003 | Rose |
| 6,595,854 | B2 | 7/2003 | Hughs-Baird et al. |
| 6,599,185 | B1 | 7/2003 | Kaminkow et al. |
| 6,599,192 | B1 | 7/2003 | Baerlocher et al. |
| 6,602,135 | B1 | 8/2003 | Gerrard |
| 6,602,137 | B2 | 8/2003 | Kaminkow et al. |
| 6,605,002 | B2 | 8/2003 | Baerlocher |
| 6,607,438 | B2 | 8/2003 | Baerlocher et al. |

| | | | | |
|---|---|---|---|---|
| 6,609,973 | B1 | 8/2003 | Weiss | |
| 6,609,974 | B2 | 8/2003 | Mead et al. | |
| 6,632,139 | B1 | 10/2003 | Baerlocher | |
| 6,632,141 | B2 | 10/2003 | Webb et al. | |
| 6,634,943 | B1 | 10/2003 | Baerlocher | |
| 6,652,378 | B2 | 11/2003 | Cannon et al. | |
| 6,669,559 | B1 | 12/2003 | Baerlocher et al. | |
| 6,672,958 | B2 | 1/2004 | Bennett | |
| 6,692,003 | B2 | 2/2004 | Potter et al. | |
| 6,695,695 | B2 | 2/2004 | Angel | |
| 6,705,944 | B2 | 3/2004 | Luciano | |
| 6,709,331 | B2 | 3/2004 | Berman | |
| 6,726,427 | B2 | 4/2004 | Jarvis et al. | |
| 6,733,389 | B2 | 5/2004 | Webb et al. | |
| 6,758,747 | B2 | 7/2004 | Baerlocher | |
| 6,767,283 | B1 | 7/2004 | Weiss | |
| 6,776,711 | B1 | 8/2004 | Baerlocher | |
| 6,783,457 | B2 | 8/2004 | Hughs-Baird et al. | |
| 6,783,458 | B2 | 8/2004 | Mead et al. | |
| 6,786,819 | B2 | 9/2004 | Baerlocher | |
| 6,796,904 | B2 | 9/2004 | Yoseloff | |
| 6,802,773 | B2 | 10/2004 | Moody et al. | |
| 6,808,452 | B2 | 10/2004 | Baerlocher et al. | |
| 6,817,943 | B2 | 11/2004 | Gerrard | |
| 6,817,944 | B2 | 11/2004 | Kaminkow et al. | |
| 6,997,805 | B2 * | 2/2006 | Vancura | 463/20 |
| 7,278,919 | B2 * | 10/2007 | Souza et al. | 463/25 |
| 2002/0045475 | A1 | 4/2002 | Glavich et al. | |
| 2002/0072402 | A1 | 6/2002 | Baerlocher | |
| 2002/0086725 | A1 | 7/2002 | Fasbender et al. | |
| 2002/0090990 | A1 | 7/2002 | Joshi et al. | |
| 2002/0142821 | A1 | 10/2002 | Baerlocher | |
| 2002/0142822 | A1 | 10/2002 | Baerlocher et al. | |
| 2002/0155883 | A1 | 10/2002 | Baerlocher | |
| 2002/0183105 | A1 | 12/2002 | Cannon et al. | |
| 2002/0183109 | A1 | 12/2002 | McGahn et al. | |
| 2003/0036419 | A1 | 2/2003 | Baerlocher | |
| 2003/0036422 | A1 | 2/2003 | Baerlocher | |
| 2003/0040360 | A1 | 2/2003 | Kaminkow | |
| 2003/0045348 | A1 | 3/2003 | Palmer et al. | |
| 2003/0045350 | A1 | 3/2003 | Baerlocher et al. | |
| 2003/0060260 | A1 | 3/2003 | Gerrard et al. | |
| 2003/0060266 | A1 | 3/2003 | Baerlocher | |
| 2003/0060273 | A1 * | 3/2003 | Kaminkow et al. | 463/25 |
| 2003/0064795 | A1 | 4/2003 | Baerlocher et al. | |
| 2003/0078093 | A1 | 4/2003 | Simms et al. | |
| 2003/0078096 | A1 | 4/2003 | Kaminkow et al. | |
| 2003/0087693 | A1 | 5/2003 | Baerlocher et al. | |
| 2003/0119583 | A1 | 6/2003 | Kaminkow et al. | |
| 2003/0157982 | A1 | 8/2003 | Gerrard et al. | |
| 2003/0162578 | A1 | 8/2003 | Baerlocher et al. | |
| 2003/0162584 | A1 | 8/2003 | Hughs-Baird et al. | |
| 2003/0195027 | A1 | 10/2003 | Baerlocher et al. | |
| 2006/0030387 | A1 * | 2/2006 | Jackson | 463/16 |

FOREIGN PATENT DOCUMENTS

| | | | |
|---|---|---|---|
| DE | 199 26 280 | A1 | 3/2000 |
| EP | 0 874 337 | A1 | 10/1998 |
| EP | 0 926 645 | A2 | 6/1999 |
| EP | 0 944 030 | A2 | 9/1999 |
| EP | 0 945 837 | A2 | 9/1999 |
| EP | 0 981 119 | A2 | 2/2000 |
| EP | 0 984 408 | A2 | 3/2000 |
| EP | 0 984 409 | A2 | 3/2000 |
| EP | 1 199 689 | A2 | 4/2002 |
| EP | 1 199 690 | A2 | 4/2002 |
| EP | 1 231 577 | A2 | 8/2002 |
| EP | 1 266 677 | A1 | 12/2002 |
| EP | 1 283 508 | A2 | 2/2003 |
| EP | 1 296 293 | A2 | 3/2003 |
| EP | 1 298 607 | A2 | 4/2003 |
| EP | 1 298 611 | A1 | 4/2003 |
| EP | 1 341 135 | | 9/2003 |
| GB | 2 197 974 | A | 6/1988 |
| GB | 2 393 022 | A | 3/2004 |
| GB | 2 395 667 | A | 6/2004 |
| GB | 2 395 668 | | 6/2004 |
| WO | WO 97/32285 | | 9/1997 |
| WO | WO 00/12186 | | 3/2000 |
| WO | WO 01/39855 | A1 | 6/2001 |
| WO | WO 02/32524 | A1 | 4/2002 |
| WO | WO 03/011409 | A2 | 2/2003 |
| WO | WO 03/026758 | A1 | 4/2003 |
| WO | WO 03/026759 | A1 | 4/2003 |
| WO | WO 03/068351 | A1 | 8/2003 |
| WO | WO 03/094122 | A2 | 11/2003 |
| WO | WO 03/096297 | | 11/2003 |
| WO | WO 03/102885 | A1 | 12/2003 |
| WO | WO 2004/022181 | A2 | 3/2004 |
| WO | WO 2004/108234 | | 12/2004 |
| WO | WO 2005/009559 | | 2/2005 |

OTHER PUBLICATIONS

Addams Family Article written by Strictly Slots, published in 2000.
Adders and Ladders Advertisement written by Barcrest Ltd., published prior to 2000.
Alien Adventure Slotto Advertisement, written by AC Coin and Slot, published in 2004.
American Thunder Screen Shots written by IGT, published in 1998.
Austin Powers Advertisement written by IGT, published in 2001.
Babooshka Advertisement, written by Atronic, published prior to 2003.
Babooshka Article, written by Strictly Slots, published in May 2002.
Battleship Advertisement (website) written by www.mikohn.com, printed Apr. 25, 2001.
Battleship Article written by Strictly Slots, published in 2000.
Big Bang Piggy Bankin Advertisement written by WMS Gaming, Inc., published prior to 2000.
Blackjack/Twenty-One Description written by Hoyle's Rules of Games, published in 1993.
Bonus Spin Red, White & Blue Advertisement written by IGT, published in 2000.
Bonus Times Article written by Strictly Slots, published in 2000.
By George Advertisement, written by IGT, published in 2002.
Caribbean Gold II Advertisement written by Aristocrat Incorporated, published in 1998.
Cash Box Advertisement & Article written by Anchor Games, Strictly Slots, published in 2000.
Chutes & Ladders Game Instructions written by Hasbro-Milton Bradley, published in 1999.
Deep Pockets Advertisement, written by IGT, published in 2002.
Description of Let's Make a Deal Television Show written by letsmakeadeal.com (2 pages), printed on Mar. 16, 2001.
Double Diamond Game Descriptions written by IGT printed on Mar. 21, 2001.
Double Up Poker Game Description written by IGT Undated.
Double Up Poker Game Description written by IGT, available prior to 2001.
Easy Street Advertisements and Articles written by Casino Data Systems, published in 2000.
Elvis Advertisement written by IGT, published in 1999.
Empire Game Advertisement written by AC Coin, published in 1996.
Entertainment, Action and . . . Fun Advertisement written by Atronic, published prior 2001.
Fire and Fortune Article written by Strictly Slots, published in 2001.
Fortune Cookie written by IGT, published in 2000.
Fox "N" Hound Advertisement written by IGT, published in 2000.
Hollywood Advertisement, written by Shuffle Master Gaming, published in 2001.
I.C. Money Advertisement written by Atronic, published in 2000.
In Between Game Description written by IGT, available prior to 2000.
Jackpot Party Brochures and Articles written by WMS Gaming, Inc., published in 1998.

Keep Your Hat On Advertisement written by Aristocrat, published in 2001.
Let's Make a Deal Advertisement written by Shuffle Master and IGT, published in 2001.
Let's Make a Deal Game Advertisement written by Bally Gaming Systems, published in 1999.
Let's Make a Deal geocities.com (2 pages), printed on Mar. 16, 2001.
Let's Make a Deal written by fortunecity.com (4 pages), printed on Mar. 21, 2001.
Let's Make a Deal written by geocities.com (10 pages), printed on Mar. 21, 2001.
Let's Make a Deal written by Illinoislottery.com (1 page), printed on Mar. 21, 2001.
Life Advertisement written by Sigma, published in 2002.
Life Article written by Strictly Slots, published in Jun. 2002.
Lifestyles of the Rich & Famous Advertisement, written by IGT, published in 2002.
Little Green Men Advertisement and Article written by IGT, Strictly Slots, published in 2000.
MegaJackpots Advertisement written by IGT, published in 1998.
Money Grab Article written by Strictly Slots, published in Apr. 2001.
Money in the Bank Advertisement written by Strictly Slots Konami, published in 2001.
Monopoly Advertisements and Articles written by WMS Gaming, Inc., Strictly Slots, published in 1998, 1999, 2000.
Monopoly Party Train Article written by Strictly Slots, published in 2002.
Neon Nights Brochure written by IGT, published in 2000.
Neon Nights Article written by Strictly Slots, published in Dec. 2000.
Odyssey Article published by Silicon Gaming in 2001.
On the Money Article written by Strictly Slots, Casino Data Systems, published in Dec. 2000.
Polly & Roger Advertisement written by VLC, Inc., published in 2000.
Price is Right "Showcases" Description written by schuminweb.com (web site), printed Mar. 16, 2001.
Price is Right Advertisement written by IGT, published in 2001.
Price is Right—Cliff Hangers Advertisement, written by IGT, published in 2001.
Psycho Cash Beast Club (including knockouts) written by Barcrest, published prior to 1998.
Richard Petty Advertisement written by IGT, published in 2000.
Running Numbers Advertisement, written by Atronic, published in 2003.
Slot Toppers Article written by Strictly Slots, published in 2000.
South Park—Dodgeball Advertisement written by IGT, published in 2000.
Spell Binder Advertisement written by IGT, published in 2000.
Sphinx Advertisement written by Atronic Casino Technology, Ltd., published in 1997.
Spiker the Biker Advertisement written by Barcrest, published prior to 2001.
State Fair written by IGT, published prior to 2001.
Take Your Pick Advertisement written by IGT/Anchor Gaming, published in 1999.
Take Your Pick Article written by Strictly Slots, published in Mar. 2001.
Texas Tea Advertisement written by IGT, published in 2000.
The Deals of Let's Make a Deal written by fortunecity.com (2 pages), printed on Mar. 16, 2001.
The Official Let's Make a Deal Website written by Bally Gaming System Website, printed on Mar. 16, 2001.
Top Cat Advertisement written by WMS Gaming, Inc., published prior to 2000.
Top Dollar Game Advertisement written by IGT, published in 1998.
Top Gear Advertisement written by Aristocrat Leisure Industries Pty. Ltd, published in Sep. 1995.
Totem Pole Advertisement written by IGT, published in 1997.
Treasure Wheel/Treasure Tunnel Advertisement written by Sigma Game, Inc., published prior to 2000.
Wheel of Fortune Advertisement written by IGT, published in 1998.
Wheel of Fortune Advertisement written by IGT, published in 1999.
Wheel Poker Article written by Strictly Slots (Anchor Games), published in Nov. 2000.
Winning Streak Web Site Description written by WMS Gaming Inc. (web site), printed on Mar. 21, 2001.
X Factor Advertisement and Website Page written by WMS Gaming, Inc., published in 1998.

* cited by examiner

FIG. 4A

BONUS GAME A 102

| | | | |
|---|---|---|---|
| 104a 1ST SELECTION OUTCOMES | 106a AWARD | 110a ADVANCE TO BONUS GAME B | 111a ADVANCE TO BONUS GAME C |
| 104b 2ND SELECTION OUTCOMES | 106b AWARD | 110b ADVANCE TO BONUS GAME B OR C | |
| 104c 3RD SELECTION OUTCOMES | 106c AWARD | | |

FIG. 4B

BONUS GAME B 202

| | | | | |
|---|---|---|---|---|
| 204a 1ST SELECTION OUTCOMES | 206a AWARD | 208a TERMINATOR | 210a ADVANCE TO BONUS GAME A | 211a ADVANCE TO BONUS GAME C |
| 204b 2ND SELECTION OUTCOMES | 206b AWARD | 208b TERMINATOR | ADVANCE TO BONUS GAME A OR C 210b | |
| 204c 3RD SELECTION OUTCOMES | 206c AWARD | 208c TERMINATOR | | |

FIG. 4C

BONUS GAME C 302

| | | | |
|---|---|---|---|
| 304a 1ST SELECTION OUTCOMES | 306a AWARD DIGIT | 310a ADVANCE TO BONUS GAME A | 311a ADVANCE TO BONUS GAME B |
| 304b 2ND SELECTION OUTCOMES | 306b AWARD DIGIT | ADVANCE TO BONUS GAME A OR B 310b | |
| 304c 3RD SELECTION OUTCOMES | 306c AWARD DIGIT | EXTRA DIGIT 309c | |

PROBABILITIES ASSOCIATED WITH EACH BONUS GAME

| 1st SELECTION | PROBABILITY OF BONUS GAME BEING SELECTED 1st | 2nd SELECTION | PROBABILITY OF BONUS GAME BEING 2nd SELECTED 2nd | 3rd SELECTION | OVERALL PROBABILITY OF ORDER BONUS GAME SELECTED |
|---|---|---|---|---|---|
| A 102 | 50% 130 | B 202 | 70% 132 | C 302 | 35% |
| A 102 | 50% 130 | C 302 | 30% 134 | B 202 | 15% |
| B 202 | 35% 230 | A | 70% | C | 10% |
| B | 35% | C | 30% | A | 25% |
| C 302 | 15% 330 | A | 70% 334 | B | 10% |
| C | 15% | B | 30% | A | 5% |
| | | | | | 100% |

FIG. 6

PROBABILITIES ASSOCIATED WITH EACH SET OF OUTCOMES
BONUS GAME

IF BONUS GAME X IS SELECTED FIRST:

| SET OF OUTCOMES 1 — % 50 | SET OF OUTCOMES 2 — 35% | SET OF OUTCOMES 3 — 15% |
|---|---|---|
| OUTCOME 1 | OUTCOME 1 | OUTCOME 1 |
| OUTCOME 2 | OUTCOME 2 | OUTCOME 2 |
| OUTCOME 3 | OUTCOME 3 | OUTCOME 3 |

IF BONUS GAME X IS SELECTED SECOND:

| SET OF OUTCOMES 1 — % 35 | SET OF OUTCOMES 2 — 50% | SET OF OUTCOMES 3 — 15% |
|---|---|---|
| OUTCOME 1 | OUTCOME 1 | OUTCOME 1 |
| OUTCOME 2 | OUTCOME 2 | OUTCOME 2 |
| OUTCOME 3 | OUTCOME 3 | OUTCOME 3 |

IF BONUS GAME X IS SELECTED THIRD:

| SET OF OUTCOMES 1 — %15 | SET OF OUTCOMES 2 — 35% | SET OF OUTCOMES 3 — 50% |
|---|---|---|
| OUTCOME 1 | OUTCOME 1 | OUTCOME 1 |
| OUTCOME 2 | OUTCOME 2 | OUTCOME 2 |
| OUTCOME 3 | OUTCOME 3 | OUTCOME 3 |

104, 106, 108, 110, 140, 204, 240

GAMING DEVICE HAVING MULTIPLE INTERRELATED SECONDARY GAMES

PRIORITY CLAIM

This application is a continuation of, claims priority to and the benefit of U.S. patent application Ser. No. 10/657,559, filed Sep. 8, 2003, which issued as U.S. Pat. No. 7,278,919, the entire contents of which are incorporated herein by reference.

CROSS-REFERENCE TO RELATED APPLICATION

This application is related to the following commonly-owned co-pending patent applications: "APPARATUS AND METHOD OF OPERATING A GAMING DEVICE HAVING A CENTRAL GAME AND A PLURALITY OF PERIPHERAL GAME," Ser. No. 10/931,656, which is a continuation of U.S. patent application Ser. No. 10/085,520 entitled "APPARATUS AND METHOD OF OPERATING A GAMING DEVICE HAVING A CENTRAL GAME AND A PLURALITY OF PERIPHERAL GAMES," which issued as U.S. Pat. No. 6,786,819 on Jul. 7, 2004.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly, to a gaming device having multiple interrelated secondary games wherein each secondary game is linked to the other secondary games.

BACKGROUND

Gaming machines are known to offer a player an opportunity to win an award in a primary game. The award provided to the player can be enhanced by a secondary game triggered in the primary game. The secondary game or bonus game often gives the players an opportunity to win additional awards or dramatically increase an award. Known gaming devices having bonus games employ a triggering event that occurs during play of the primary or base game of the gaming device. The triggering event temporarily stalls or halts the base game play and enables a player to enter a second, different game, which is the bonus game. The player plays the bonus game and likely receives an award before returning to the base game. The potential for a player to win additional awards or dramatically increase an award adds additional enjoyment and excitement to the game. In many gaming devices, however, the bonus game associated with the gaming device is limited to one game. Most bonus games are limited to a single game provided to the player that produces its own award or enhances the award provided to the player in the base game.

U.S. patent application Ser. No. 10/085,520 filed on Feb. 28, 2002, published Aug. 28, 2003, discloses a gaming device having one central game and at least one and a plurality of peripheral games. The central game includes at least one or a plurality of central game outcomes. At least one of the central game outcomes is a transfer outcome or transfer. After the player picks the transfer outcome, one of the peripheral games begins. The peripheral game enables the player to go to another peripheral game or return to the central game and pick at least one more central game outcomes.

There is a continuing need to provide a player with the enjoyment and excitement of a new and different bonus game which provides the player an opportunity to play a plurality of inter-linked bonus games without having to return to one or more of the same bonus games.

SUMMARY

The present invention relates in general to a gaming device having multiple games interlinked to provide a player the potential of receiving an award for one or more of the games. In one embodiment, when a triggering event occurs in the wagering base game, the gaming device initiates a bonus round by randomly selecting a secondary game from a plurality of secondary games which are preferably different. In one embodiment, each of the bonus games in the bonus round has different outcomes, different possible outcomes or different sets of outcomes available to the player. In one embodiment, the different outcomes, different possible outcomes or different sets of outcomes available to the player depend on the order the bonus game is selected, played or presented by the gaming device or the player. In other words, certain outcomes for a particular bonus game are available to the player if that bonus game is picked first. Similarly, if that bonus game is picked second, different outcomes for that game are available to the player. If that game is picked third, a third, preferably different, set of outcomes is available to the player for that game.

In an alternative embodiment, the outcomes are the same for each order a bonus game is selected. In other words, a set of possible outcomes is associated with all bonus games in the bonus round picked first; another set of outcomes is associated with all bonus games picked second; etc. In a further alternative embodiment, a probability of receiving particular outcomes changes based on the order in which the bonus game is selected. The outcomes associated with a bonus game selected first in one embodiment, for example, have a probability table for the outcomes which is different from the probability table for the outcomes of the bonus game if the bonus game is selected second.

In one embodiment, each of the bonus games in the bonus round has a plurality of selections such as player-selectable selections to determine the outcome or outcomes, if any, provided to the player. In one embodiment, the selections or number of selections available to the player depend on the order in which the bonus game is selected.

In one embodiment, the outcome(s) associated with one or more of the selections of one, a plurality of, or all of the bonus games in the bonus round include transfer symbols that transfer or enable the player to be transferred to one of the other bonus games. The transfer symbols serve to interrelate or link the bonus games with one another, allowing the player the opportunity to sequentially play each bonus game and, potentially, win an award from each bonus game. In one embodiment, once a player has played one bonus game, the player is no longer eligible to be subsequently transferred to that bonus game. Therefore, transfer symbols that enable the player to be subsequently transferred to one of the other bonus games are preferably included among the outcomes of the presently played bonus games if at least one other bonus game remains available for selection. For example, in one embodiment, a bonus game selected first includes transfer symbols to each of the other bonus games among its outcomes. A bonus game selected second includes transfer symbols to the bonus games which have not been previously selected or played. A bonus game selected last, in a preferred embodiment, has no transfer symbols associated with its selections because all of the other bonus games have been selected or played.

In one embodiment, a plurality of bonus games in a bonus round are interrelated, and one of the bonus games is randomly or otherwise, selected by the game upon the triggering of a bonus event in the base game. In alternative embodiments, the player may select the first bonus game. In one embodiment, each of the bonus games in the bonus round has a plurality of selections such as player-selectable selections to determine the outcome or outcomes. In one embodiment, once a bonus game is selected and the order in which the bonus game was selected is determined, the player, in one embodiment, is presented with a plurality of selections with associated outcomes corresponding to the order in which the bonus game was selected. The outcomes may include advancing the player to the other bonus games, one or more awards (such as values or modifiers), or any other suitable outcome(s) adapted to be provided to the player. It should be appreciated that the award outcomes may also allow the player to make another selection. If the bonus game is the second game to be selected, or is selected second among the bonus games, the bonus game may include selections having a different set of outcomes associated with each selection. The outcomes may include advancing of the player to a bonus game that has not been selected, awards, or any other suitable outcome(s). If the bonus game is picked third out of three possible bonus games, or is the last bonus game to be selected, the outcomes associated with the selections preferably include awards or other suitable outcome(s), but do not include advancing the player to other bonus games if the player has previously played or selected all other bonus games.

In another embodiment, the bonus game can include outcomes that terminate the bonus round.

In one embodiment of a bonus game, the player is provided a plurality of selections having associated outcomes which include digits of an award. If the bonus game is selected first or second, the outcomes associated with the selections include digits of an award and transfers to other bonus games. If the bonus game is selected third out of three possible bonus games or last, the outcomes include only award digits and no transfers.

It is therefore an advantage of the present invention to provide a gaming device having a variety of multiple interrelated secondary games.

An advantage of the present invention is to provide a gaming device which advances the player to a different bonus game based on the player selections.

Another advantage of the present invention is to provide a gaming device which enables a player to advance from one bonus game to a different bonus game and be eligible for a particular group of outcomes based on the order in which the bonus game is selected.

Other objects, features and advantages of the invention will be apparent from the following detailed disclosure, taken in conjunction with the accompanying sheets of drawings, wherein like numerals refer to like parts, elements, components, steps, and processes.

Additional features and advantages are described herein, and will be apparent from, the following Detailed Description and the figures.

BRIEF DESCRIPTION OF THE FIGURES

FIGS. 4A, 4B and 4C are tables of one embodiment of the present invention illustrating the outcomes associated with each bonus game depending on what order the bonus game is selected.

FIG. 6 is a distribution of a table of one embodiment of the present invention illustrating the distribution of probabilities among sets of outcomes.

DETAILED DESCRIPTION

Gaming Device and Electronics

Figure 1A:
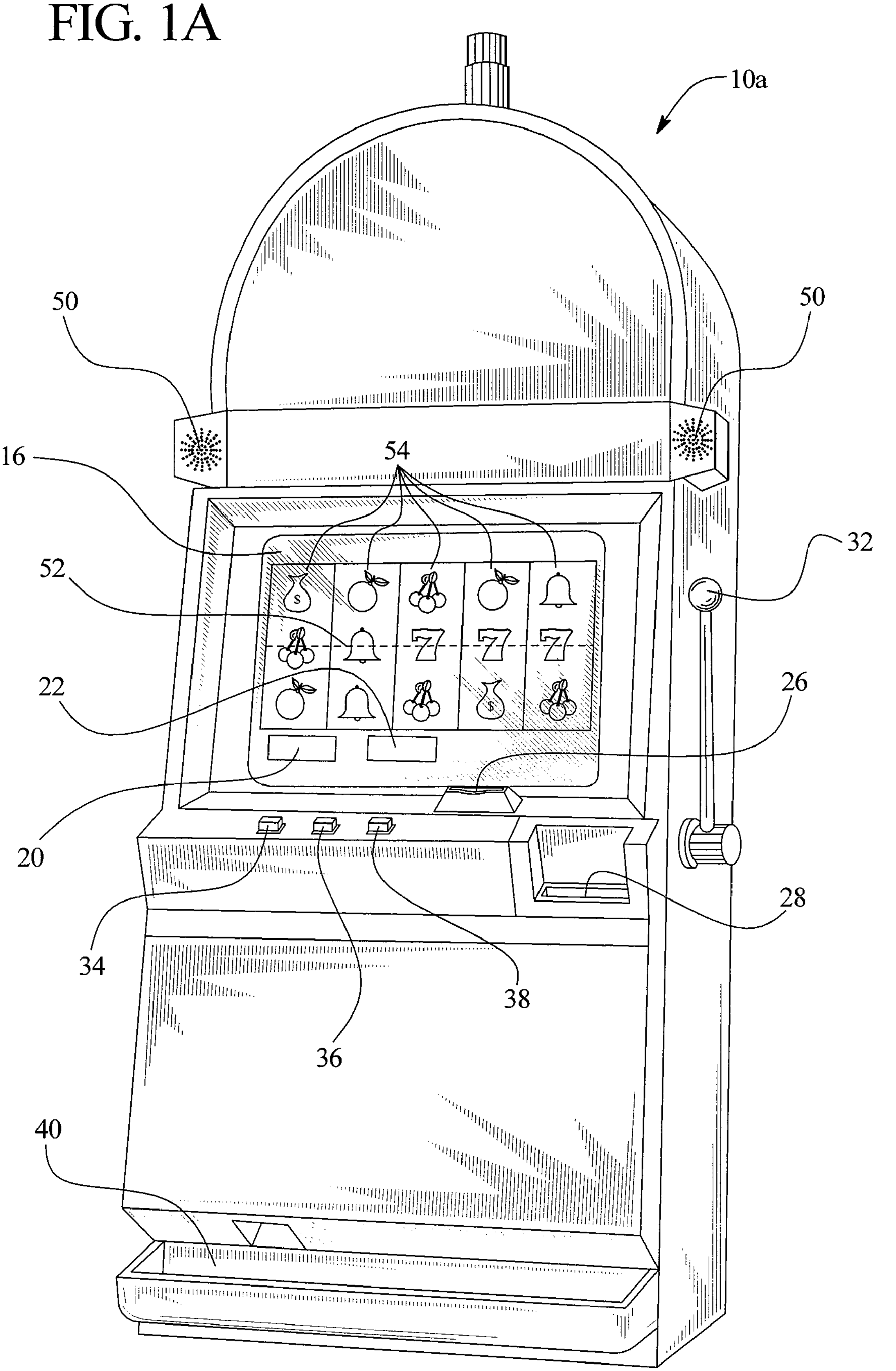
FIG. 1A is a front perspective view of one embodiment of the gaming device of the present invention.
Figure 1B:
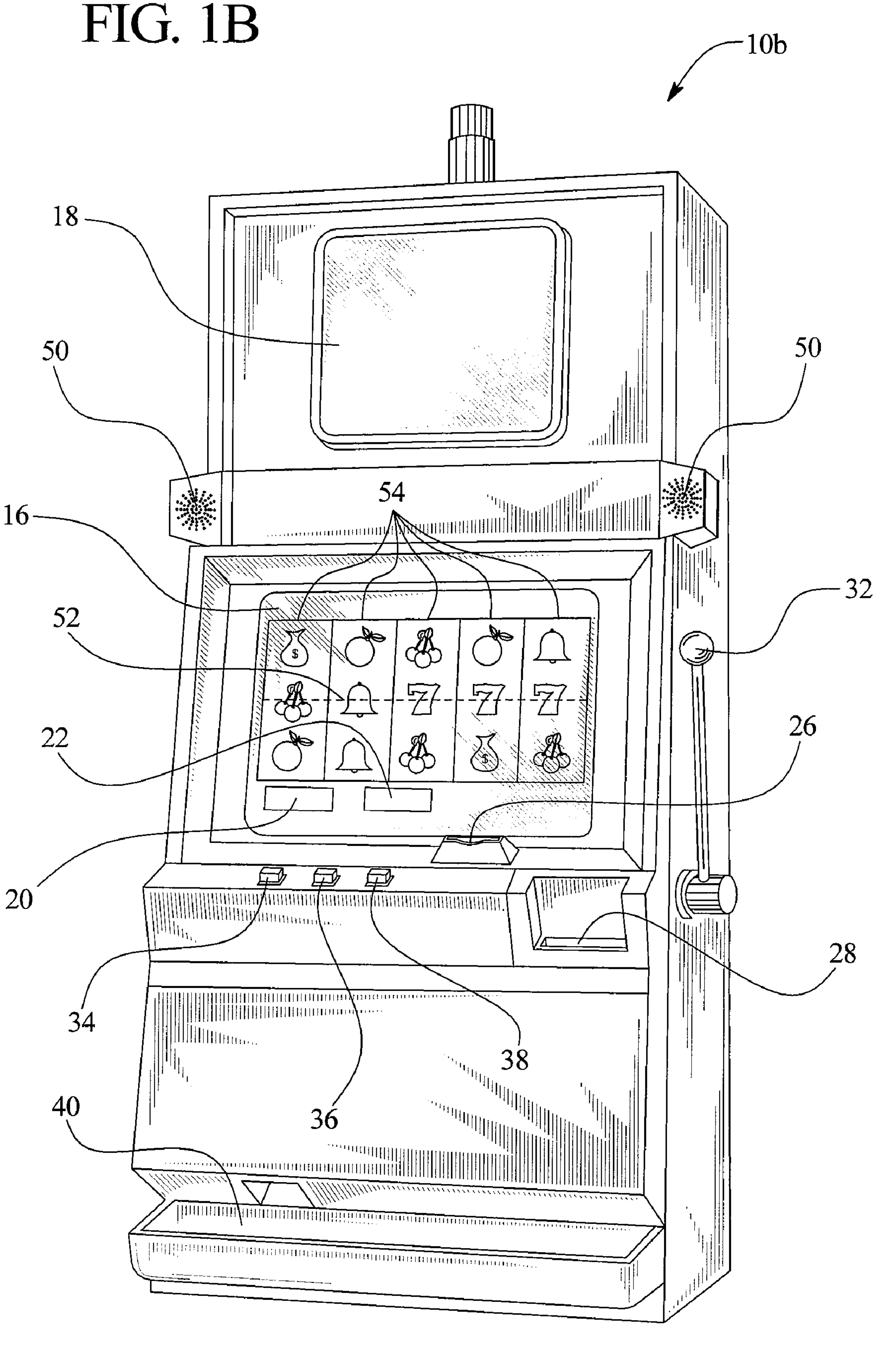
FIG. 1B is a front perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
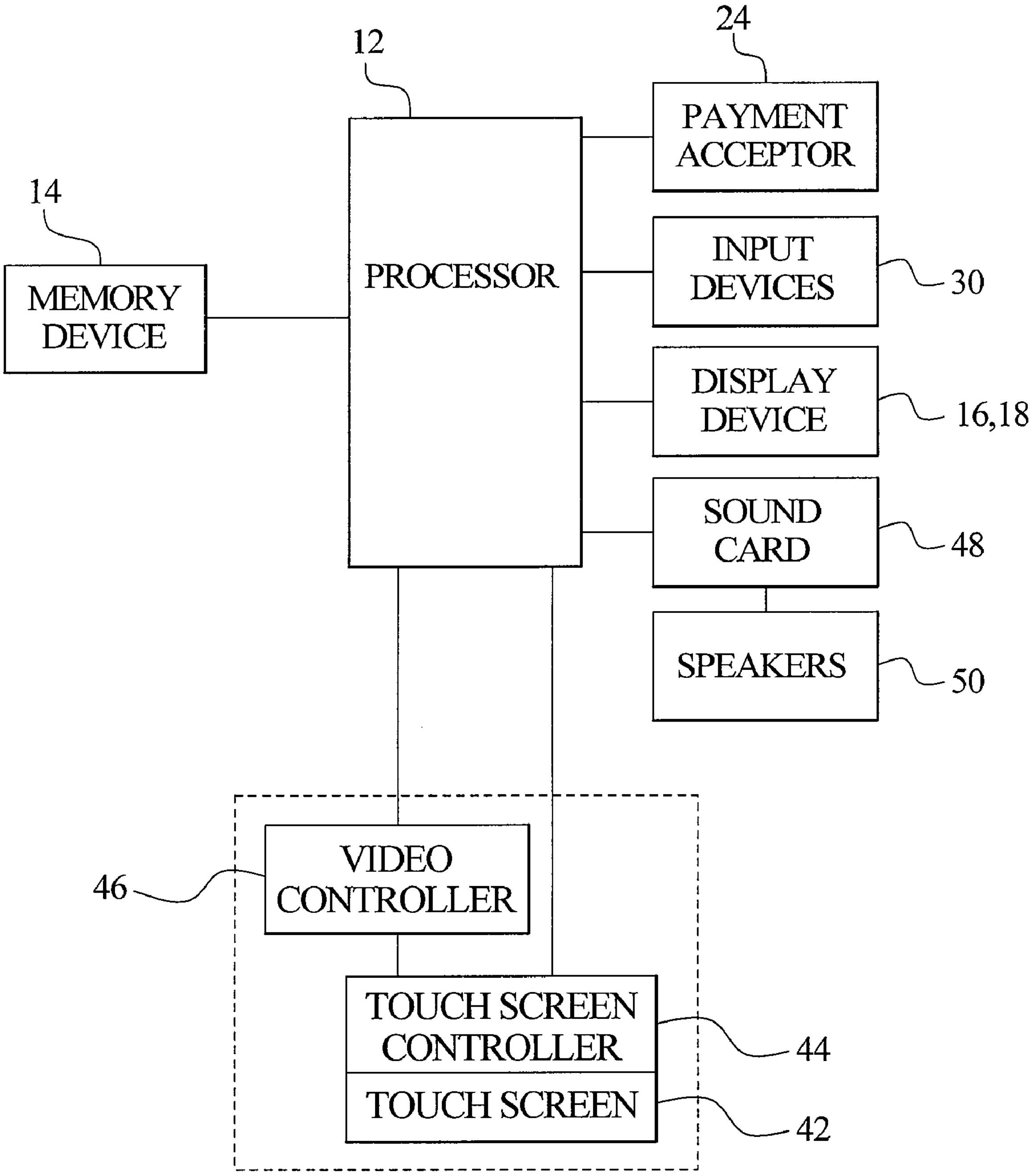
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism.

In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 26. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, as illustrated in FIGS. 1A and 1B, a base or primary game may be a slot game with one or more paylines 56. The paylines may be horizontal, vertical, circular, diagonal, angled or any combination thereof. In this embodiment, the gaming device displays at least one and preferably a plurality of reels 34, such as three to five reels 34 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 34 are in video form, the plurality of simulated video reels 34 are displayed on one or more of the display devices as described above. Each reel 34 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning pattern.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Figure 2B:
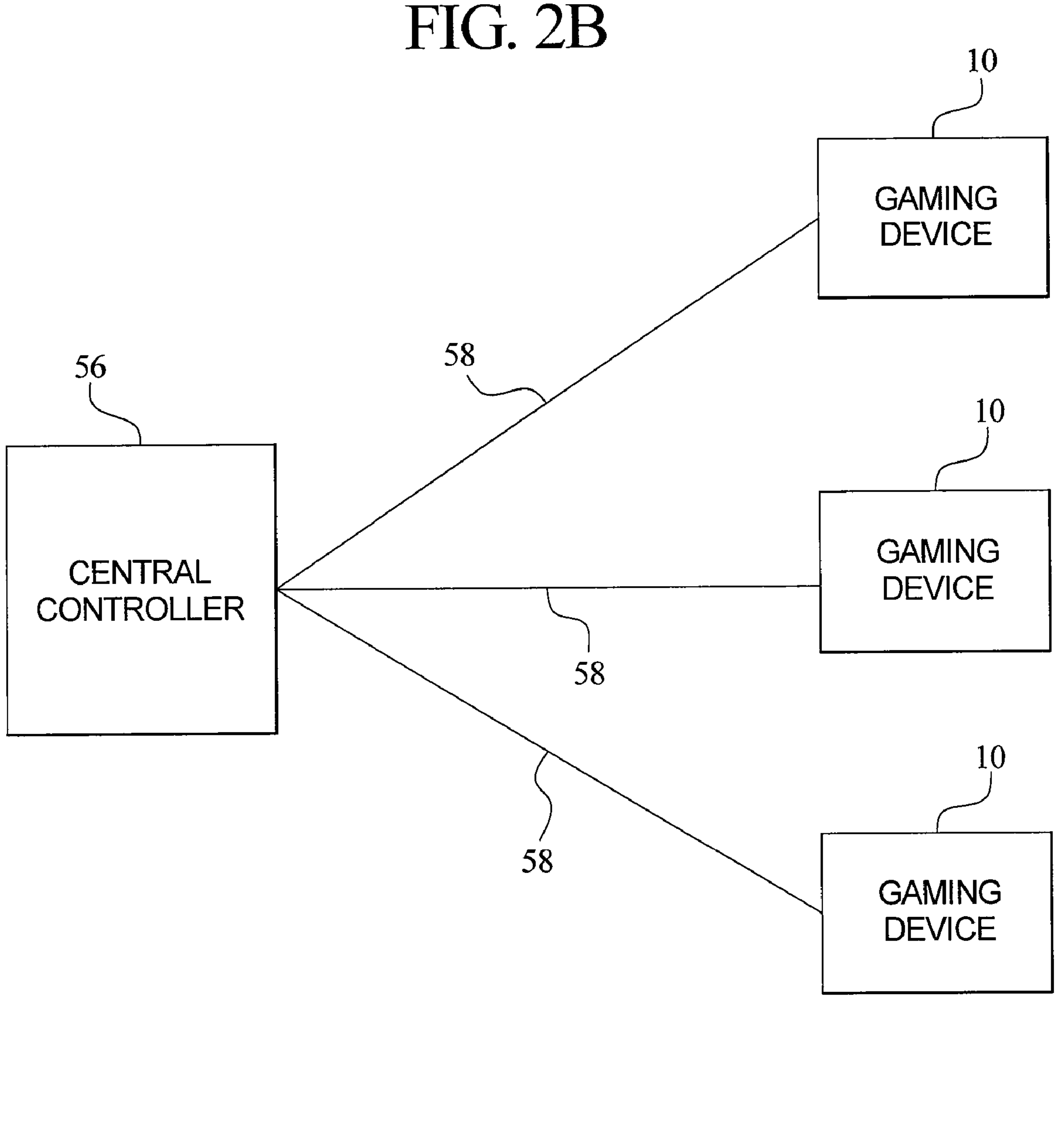
FIG. 2B is a schematic block diagram of a central determination embodiment of the gaming device of the present invention.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller.

In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Interrelated Bonus Games

Figure 3:
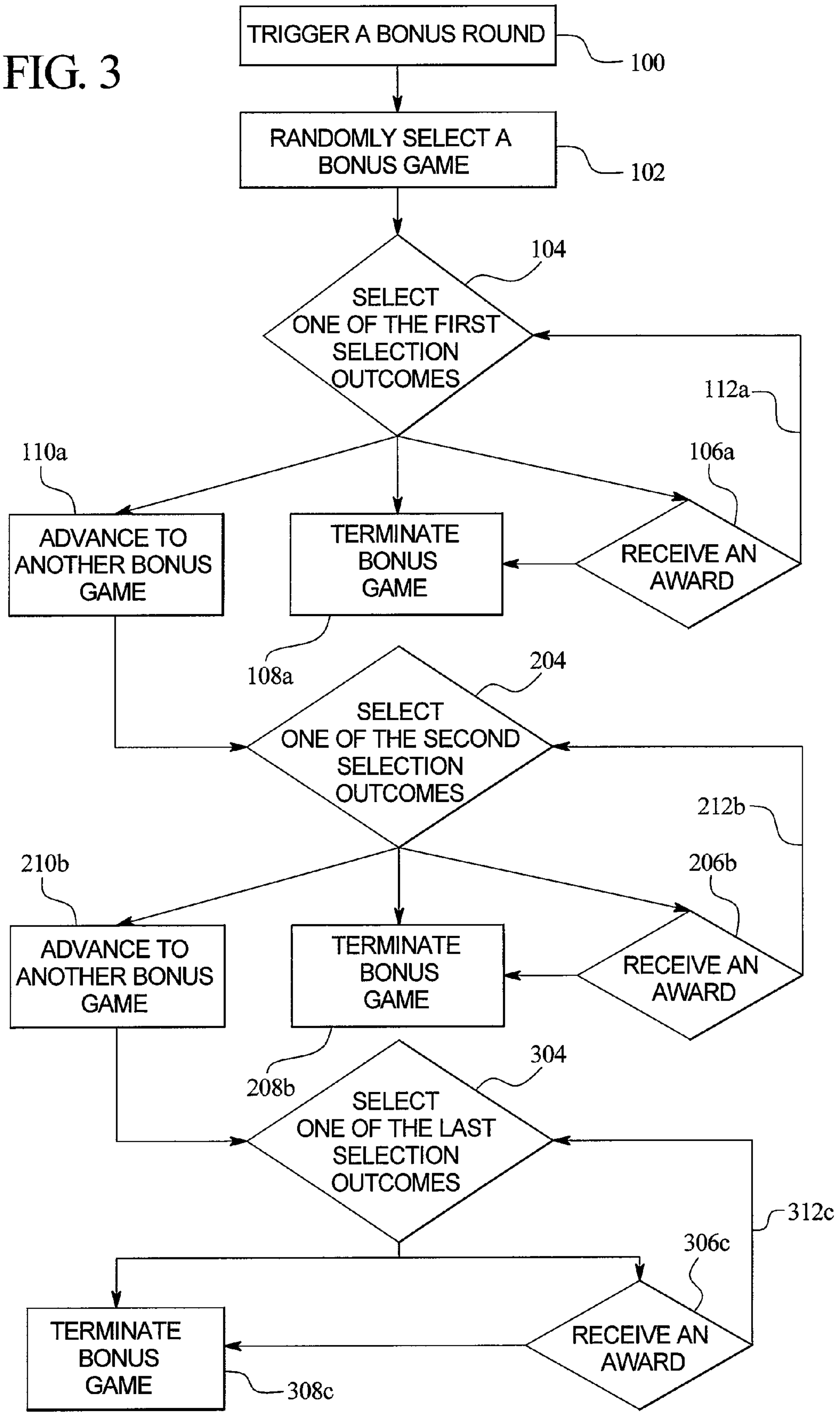
FIG. 3 is a schematic block diagram of the possible steps of one embodiment of the gaming device of the present invention.

Referring now to FIG. 3, one embodiment of the present invention includes a potential sequence of events that enables a player to experience a plurality of interrelated games. In each game the player can receive one or more outcomes that depend on when the game is selected or played in relation to when the other games are selected or played. In one embodiment, the sequence of events begins with triggering a bonus round in the base game as indicated by block 100. In one embodiment, the gaming device randomly selects a bonus game from a plurality of bonus games as indicated by block 102. Alternatively, the player is presented with a selection of bonus games which, in one embodiment, are masked or hidden from the player. In each bonus game the gaming device enables the player to select from a plurality of selections as indicated in diamonds 104, 204 and 304 each including at least one outcome as indicated in blocks 108, 110, 208, 210 and 308 diamonds 106, 206 and 306. In a preferred embodiment, the outcomes, different possible outcomes, or set of outcomes available to the player depend on the order the bonus game is selected or played by the gaming device or the player. In one embodiment, the outcomes available to the player in each of the bonus games are, generally, to receive an award as indicated by diamonds 106*a*, 206*b* and 306*c*, terminate the bonus game as indicated by blocks 108*a*, 208*b* and 308*c*, or transfer or advance the player to another bonus game as indicated by blocks 110*a* and 210*b*. It should be appreciated that more than one outcome can be associated with selections in each bonus game. In one embodiment, if the player receives an award as an outcome in the bonus game as indicated by diamonds 106*a*, 206*b* and 306*c*, the bonus game is terminated as indicated by blocks 108*a*, 208*b* and 308*c*. Alternatively, if a player receives an award as an outcome in the bonus game, the gaming enables the player to make another selection 112*b* as indicated by diamond 104. It should be appreciated that the gaming device can provide the player with a completely new or different plurality of selections including, in one embodiment, a rearrangement of the outcomes or, alternatively, a new determination of the outcomes associated with each selection when the player is provided an opportunity to pick another selection.

If the gaming device advances the player to another bonus game as indicated by block 110*a*, the gaming device provides the player another plurality of outcomes as indicated by diamond 204. The outcomes in one embodiment which are associated with the selections of a bonus game not selected first or last include receiving an award as indicated by block 206*b*, terminating the bonus game as indicated by block 208*b*, or advancing the player to a bonus game which has not been played as indicated by block 210*b*. Again if the player receives an award as indicated by block 206*b*, the bonus game is either terminated as indicated by block 208*b* or the game allows the player to make another selection 212*b* as indicated by diamond 204.

If the player is advanced to another bonus game 210*b*, the gaming device provides the player with a plurality of selections having a plurality of outcomes as indicated by blocks 306*c* and 308*c*. The outcomes in the remaining bonus game, in one embodiment, include receiving an award as indicated by block 306*c*, additional selections 312*c*, and terminating the bonus game as indicated by block 308*c*.

Referring now to FIGS. 4A, 4B, and 4C, one embodiment of the present invention includes three interrelated bonus games; however, it should be appreciated that the present invention can include any suitable plurality of bonus games. FIG. 4A illustrates the different outcomes available and associated with the plurality of selections presented to the player in a bonus game when one of the three bonus games, bonus game A 102, is the first game to be selected. If bonus game A 102 is selected first by the gaming device 10 or by the player, the outcomes available to the player include at least one award 106*a*, at least one advance 110*a* or transfer to bonus game B, or at least one advance 111*a* or transfer to bonus game C.

If bonus game A 102 is not the first selection, i.e., the player has transferred from another bonus game to bonus game A, and bonus game A is not the last selection, the outcomes 104*b* are available or associated with the selections presented to the player. The outcomes 104*b* of the bonus game include at least one award or transfer 106*b* and at least one advance or transfer to either bonus game B or bonus game C 110*b*, depending on which bonus game the player has already selected or played. If bonus game B 202 has been selected or played, at least one advance or transfer to bonus game C 302 is available or associated with the selections presented to the player. For example, if the player has transferred from bonus game B 202 to bonus game A 102, one of the outcomes 104*b* of the second selection includes a transfer to bonus game C 110*b* because bonus game C 302 has not been selected or played. If bonus game A 102 is the third or last bonus game to be selected, the outcomes 104*c* available to the player include at least one award or award component 106*c*.

In FIG. 4B, in one embodiment, an additional outcome is included among the possible outcomes of a bonus game. In bonus game B 202, one of the outcomes includes terminating the bonus game. If a player selects a terminator 214*a*, 214*b* or 214*c*, in one embodiment, the bonus round is over, and the player only receives an award from previous selections, if any during bonus game B or from previous bonus games, if any. As illustrated in FIG. 4B, if bonus game B 202 is the first bonus game of the three bonus games to be selected, the outcomes 204*a* associated with the selections presented to the player include at least one award 206*a*, at least one terminator 208*a*, at least one advance or transfer to bonus game A 210*a* and at least one advance to bonus game C 211*a*. If bonus game B 202 is not the first selection, i.e., the player has advanced to bonus game B 202 from another bonus game, and bonus game B 202 is not the last selection, the outcomes available or associated with the selections presented to the player are at least one award 206*b*, at least one terminator 208*b*, and at least one advance or transfer to bonus game A or C 210*b*, depending on whether bonus game A 102 or bonus game C 302 has been selected or played. For example, if the player has advanced from bonus game A 102 to bonus game B 202, the outcome of the second selection 204*b* would include at least one advance to bonus game C 302 because bonus game C 302 has not yet been selected or played. If bonus game B 202 is the third or last bonus game to be selected, the outcomes 204*c* available to the player are at least one award 206*c* and at least one terminator 208*c*.

It should be appreciated that any suitable type of bonus game may be employed in accordance with the present invention. Accordingly, FIG. 4C illustrates another type of bonus game in which an outcome includes a number or digit of an award. U.S. patent application Ser. No. 09/934,003, filed Aug. 20, 2001, Publication No. 2003/0036422 A1. This application describes a game wherein the award consists of individual digits generated by the gaming device and positioned by the player or by the gaming device in a random or predetermined digit position of the award. The digits include the numbers 0, 1, 2, 3, 4, 5, 6, 7, 8 and 9. If an award digit is provided to the player, the digit, in one embodiment, is placed in the one's position of the award. If the player is provided additional award digits, in one embodiment, each of the additional digit(s) is automatically placed in the predetermined one's position shifting the previous digit(s) to the ten's or hundred's position, as the case may be. For example, if the player is provided the digit, eight, the eight is automatically placed in the predetermined one's position of the award. If, subsequently, the player receives the digit, seven, the seven is placed in the one's position of the award and the two is shifted to the ten's position of the award to produce an award value of eighty-seven, and so on. It should thus be appreciated that the present invention can employ the games described in that application.

If bonus game C 302 is the first bonus game to be selected, the outcomes 304*a* available to the player are at least one award digit 306*a*, at least one transfer or advance 310*a* to bonus game A and at least one transfer or advance 311*a* to bonus game B. If bonus game C 302 is not the first bonus game to be selected, i.e., the player has advanced from another bonus game to bonus game C 302, the outcomes 304*b* available or associated with the selections presented to the player include a plurality of award digits 306*b*, and at least one advance to bonus game A or bonus game B 310*b*, depending on whether bonus game A or B has been selected or played. If bonus game C 302 is the third or last bonus game to be selected, the outcomes 304*c* available to the player include a plurality of award digits 306*c*. In one embodiment, if the gaming device 10 provides the player an award digit 306*a* in the first or second selection, the gaming device may provide an additional selection to the player to enable the player to receive either another award digit 309*c* or, if bonus game C 302 is not the last game to be selected, an advance to another bonus game. It should be appreciated that an extra award digit 309*c* can be associated with at least one selection in lieu of an advance to another bonus game. It should be appreciated that other outcomes such as modifiers and additional picks may be associated with the selections of a bonus game and appropriated to the bonus game based on the order in which a bonus game is selected. Additionally, it should be appreciated that a plurality of outcomes may be associated with one selection.

Figures 5A, 5B:
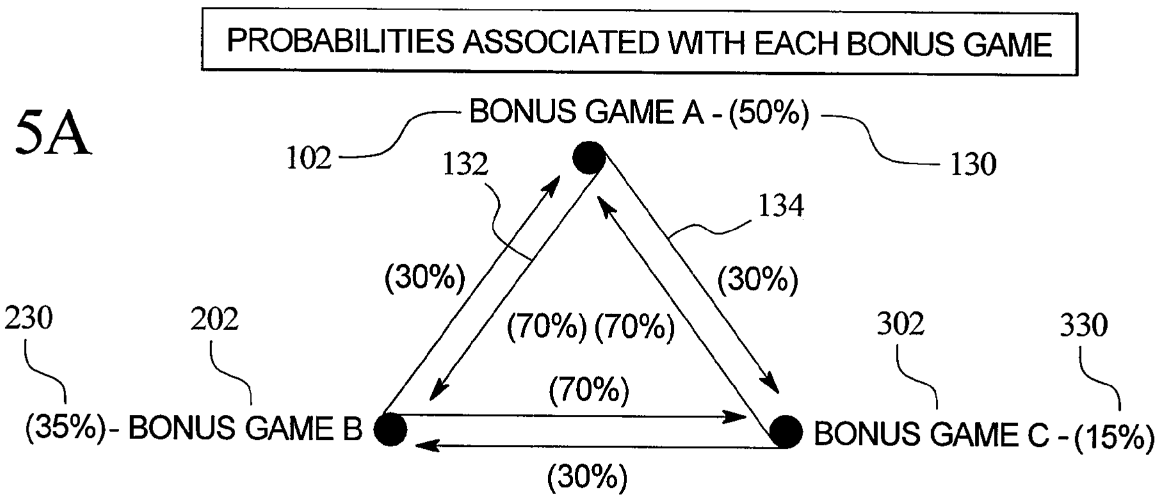
FIGS. 5A and 5B are a diagram and table of one embodiment of the present invention illustrating the different order in which three bonus games are selected and the probabilities associated with each bonus game which determine the order of selection.

Referring now to FIGS. 5A and 5B, a simple way of illustrating the possible sequences or order in which, in one embodiment, three bonus games could be selected or played without allowing a game to be repeated is illustrated by the diagram in FIG. 5A. When the gaming device selects a bonus game, the player originates from that bonus game on the diagram. Subsequent selected bonus games made available to the player are positioned in one direction, clockwise or counter-clockwise, around the triangular diagram. FIG. 5A also indicates an example distribution among the bonus games in one embodiment of probabilities.

FIG. 5B is a table which corresponds to the diagram and associated probabilities in FIG. 5A and illustrates the potential order in which three bonus games can occur or be triggered by the events of the game. The first selection, in one embodiment, includes a random selection by the gaming device to determine which bonus game the player will begin playing. In a bonus round with three interrelated bonus games, there are six permutations of the order of the bonus games possible to the player. In one embodiment, each bonus game is capable of transferring or advancing the player to another of said bonus games if another bonus game has not been selected or played. If the player is in a bonus game that is the last selected game, the player cannot be transferred to another bonus game. In other words, the outcome of transferring a player to another bonus game is not available in a bonus game that is the third of three bonus games to be selected.

In an alternative embodiment, probabilities are associated with each of the bonus games, wherein the likelihood of a bonus game being initially selected by the gaming device is based on the probability associated with each bonus game. In FIGS. 5A and 5B, bonus game A is assigned a probability 130 of being selected first of 50%, bonus game B a probability 230 of being selected first of 35% and bonus game C, a probability 330 of being selected first of 15%.

Subsequent bonus games played by the player, in one embodiment, are determined by the selection made by the player. Accordingly, the gaming device, in one embodiment, varies the number of selections for a particular outcome in accordance with a probability associated with each outcome.

In the embodiment illustrated in FIGS. 5A and 5B, probabilities are associated with the subsequently selected bonus games. In one embodiment where the player picks from a plurality of selections having associated outcomes, the probability associated with a bonus game determines the number of selections having outcomes transferring the player to that game. For example, in FIGS. 5A and 5B the probability 132 of bonus game B being selected second after bonus game A is selected first is 70%. Therefore, in bonus game A, 70% of the outcomes, or, alternatively, 70% of the transfer outcomes presented to the player for selection, advance the player to bonus game B. It follows, then, that the probability of bonus game C being selected second when bonus game A is selected first is 30%.

In an embodiment where each bonus game is played only once, if bonus game A is played first and bonus game B is played second, bonus game C must be played third. The probability 136 that this sequence will occur, i.e., bonus game A is selected first, bonus game B is selected second, and bonus game C is selected third, is, therefore, 35% (50%× 70%).

Referring now to FIG. 6, one embodiment includes associating probabilities with different outcomes or sets of outcomes in each bonus game based on the order in which the bonus game is selected. The probabilities associated with the outcomes or set of outcomes determine the likelihood those outcomes will be associated with selections presented to the player in the bonus game. In one embodiment, the probability associated with each outcome or set of outcomes is different for each set of outcomes based on the order in which the bonus game is picked. In FIG. 6, for example, the set of outcomes 104 in any bonus game (bonus game X) has a 50% probability 140 of being provided in the bonus game if bonus game X is selected first. It should be appreciated that the outcomes in one set may provide a higher likelihood of transferring or advancing the player to a particular bonus game. It should be appreciated that a set of outcomes can include different numbers of outcomes associated with the selections. However, if bonus game X is selected second, the probability 140 of the set of outcomes 104 being provided in the bonus game is only 35% and the set of outcomes 204 has a probability 240 of 50% of being provided in the bonus game. It should be appreciated that any distribution of probabilities may be used to determine the likelihood that an outcome or set of outcomes is provided in the bonus games based on the order in which the bonus game is selected.

Figure 7A:
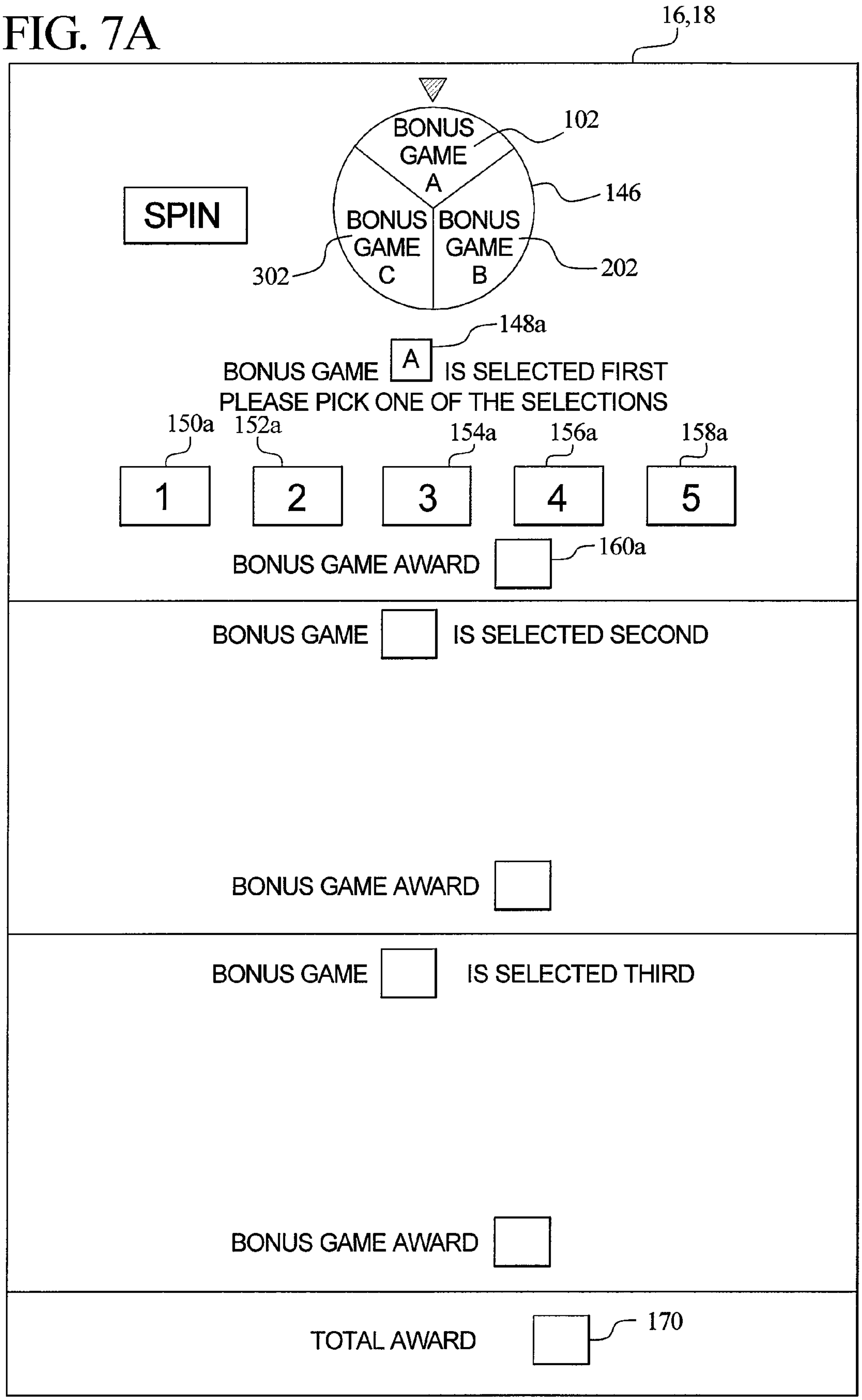
FIGS. 7A, 7B, 7C, 7D, 7E, 7F, 7G, 7H and 7I are front perspective views of the display of one embodiment of the present invention illustrating a scenario in which all of the interrelated bonus games are played by the player.
Figure 7B:
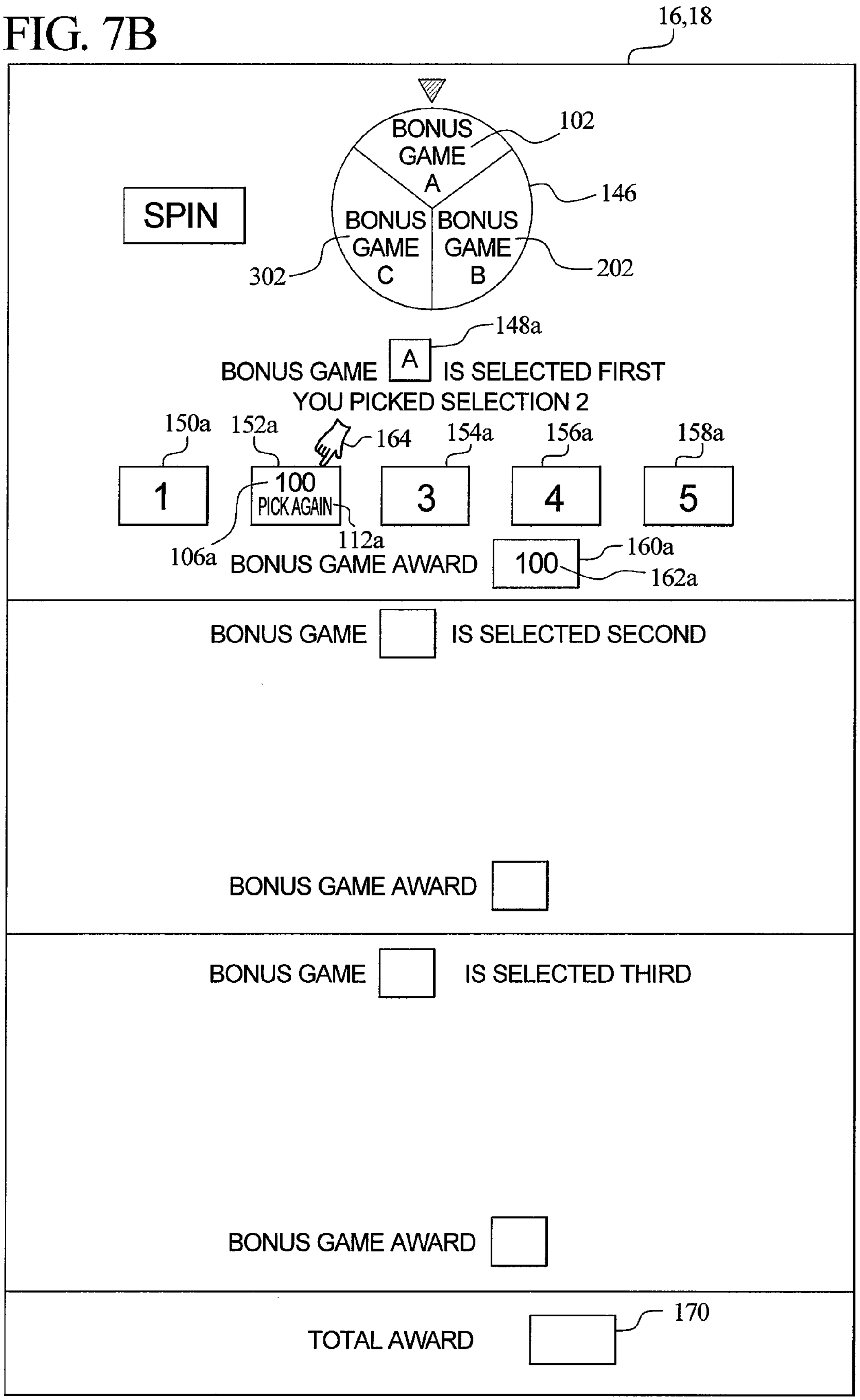

Referring now to FIG. 7A to 7I, in an example of one embodiment of the present invention, upon the triggering of a bonus game in the base game, the gaming device provides the player multiple interrelated bonus games to be played in the bonus round. It should be appreciated that each bonus game can alternatively be displayed separately on a separate display or on the same display without the previous bonus game being displayed. In FIG. 7A, the gaming device includes three interrelated bonus games. In one embodiment, the gaming device randomly generates a first selection of the bonus games and displays the selected bonus game on a display device such as a wheel 146. In FIG. 7A, the gaming device selects bonus game A 102 as the first bonus game to be played by the player. It should be appreciated that bonus game A has a high likelihood of being selected first if the probability 130 of 50% in the example embodiment illustrated in FIGS. 5A and 5B is associated with bonus game A. In addition, the gaming device displays a plurality of selections with associated outcomes based on the bonus game A being picked first. Referring back to FIG. 4A, when bonus game A 102 is the first bonus game to be selected, the outcomes available to the player include a plurality of awards, at least one advance to bonus game B and at least one advance to bonus game C.

The player is subsequently instructed to select one of the five selections of the bonus game A displayed by the gaming device. It should be appreciated that, alternatively, the gaming device can instruct the player to select more than one selection or provide the player with outcomes associated with the selections which include additional picks of the selections. The player in FIG. 7B picks selection 2. In the example illustrated in FIG. 7B, the player is provided an award outcome 106*a* and an outcome 112*a* that enables the player to make an additional selection in the game. It should be appreciated that more than one outcome can be associated with each selection. The award outcome associated with selection 2 includes an award 106*a* of one hundred. The award 106*a* of one hundred is added to the bonus game display 160*a* for a bonus game award 162*a* of one hundred.

Figure 7C:
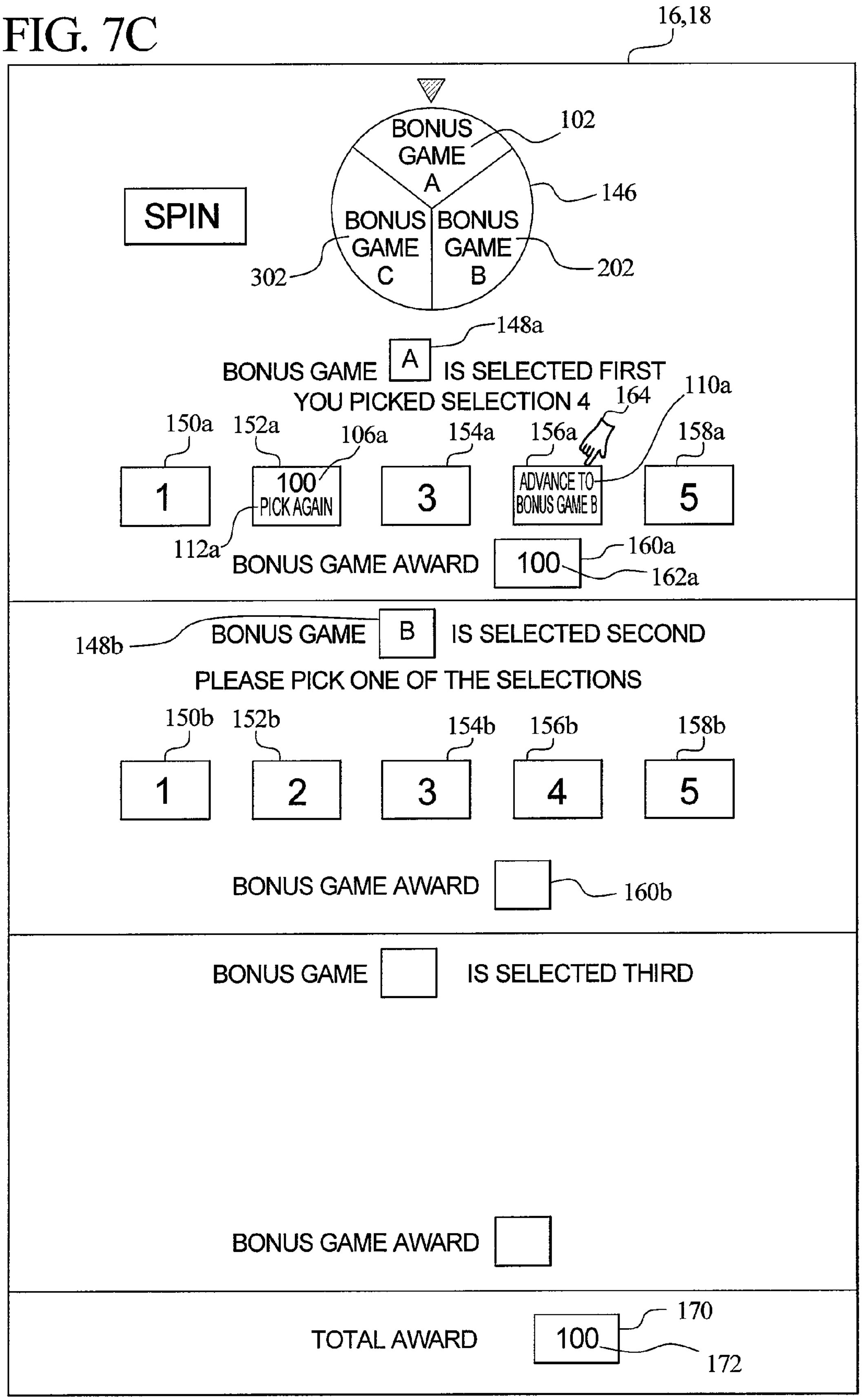

An additional outcome 112*a* is associated with selection 2 which allows the player to pick another selection. The player picks selection 4 as illustrated in FIG. 7C. FIG. 7C reveals the outcome selected by the player which is an advance to bonus game B 110*a*. Advancing the player to bonus game B ends or terminates bonus game A. The award 106*a* of one hundred is accumulated during bonus game A and is added to the total award display 170, and the game bonus round continues with the display of bonus game B 202.

Figure 7D:
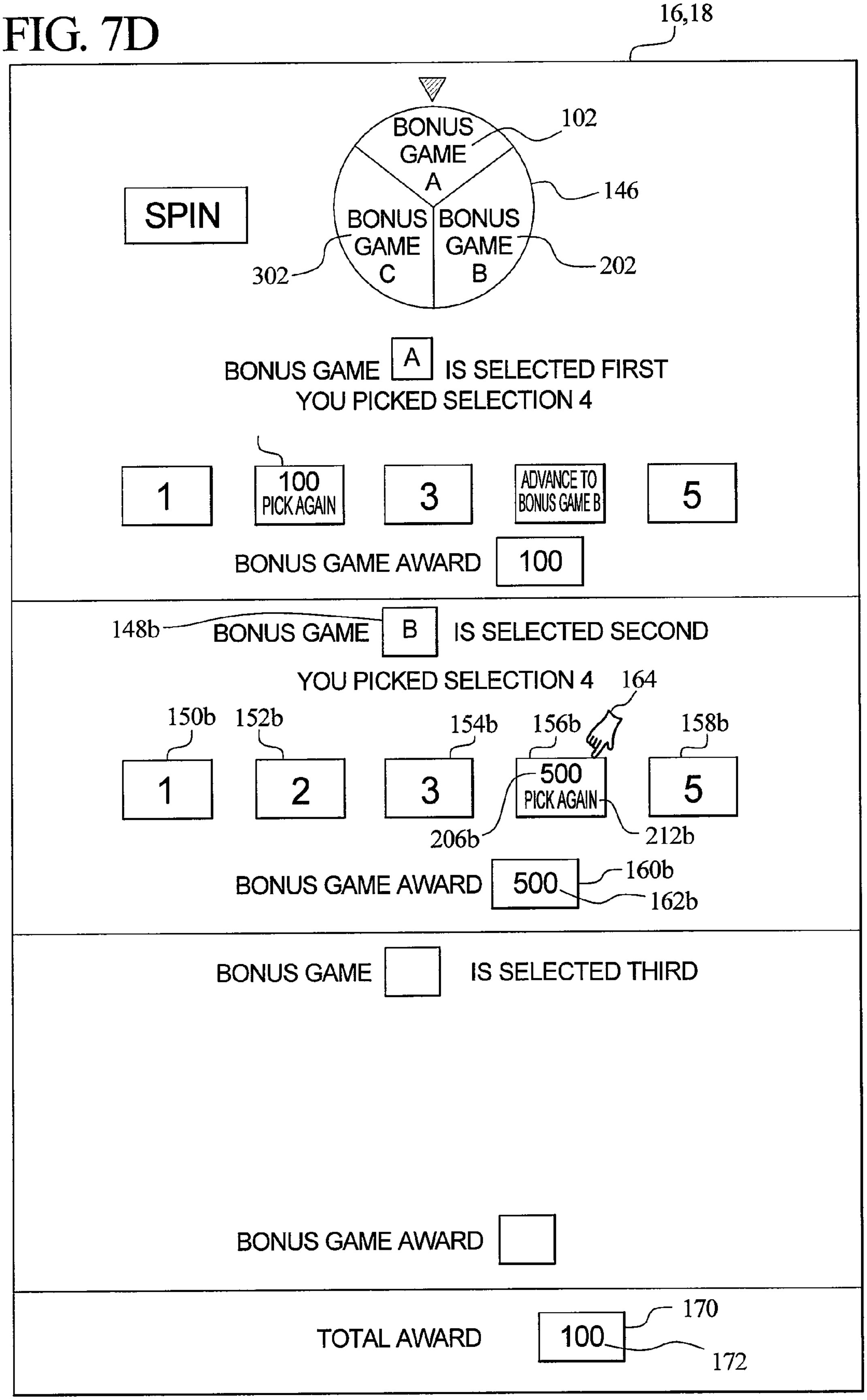
Figure 7E:
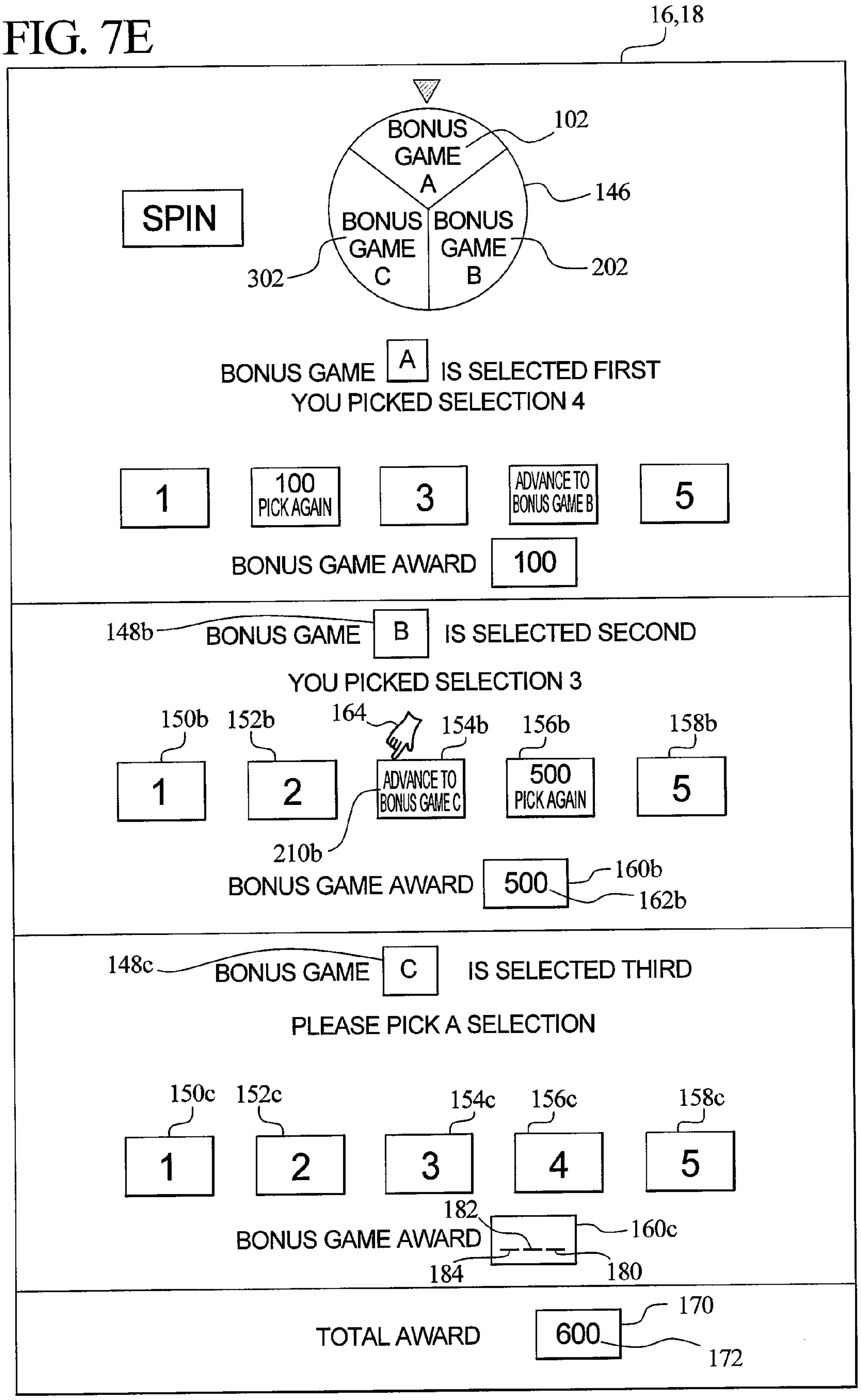

Upon the advance of the player to bonus game B 202 in FIG. 7C, the player is directed to make a selection among the plurality of selections 150 to 158 associated with bonus game B 202. Referring back to FIG. 4B, if bonus game B 202 is the second bonus game to be selected, the outcomes include at least one award 206*b*, at least one terminator 208*b*, and at least one advance 210*b* to the bonus game that has not been selected or played. Because the player was transferred from bonus game A 102 to bonus game B 202, the outcome including an advance 210*b* to another bonus game, in one embodiment, includes an advance to bonus game C only. In FIG. 7D, the player picks selection 4. The outcomes associated with selection 4 include an award 206*b* of five hundred and an outcome 212*b* which allows the player to pick another selection. The award of 206*b* of five hundred is added to the bonus game award display 160*b* for a bonus game award 162*b* of five hundred. In FIG. 7E, the player picks the selection with the associated outcome which includes an advance 210*b* to bonus game C 302. Advancing the player to bonus game C ends or terminates bonus game B. The award 162*b* of five hundred provided to the player in bonus game B is added to the total award display 120 and the bonus round continues with the display of bonus game C.

Upon transfer of the player to bonus game C 302, the gaming device 10 presents the player a plurality of selections 150*c* to 158*c* from which the player is instructed to select at least one selection. Referring back to FIG. 4C, if bonus game C is the third game to be selected, the outcome available to the player is an award digit 306*c* or plurality of award digits.

In FIG. 7E, the gaming device instructs the player to select one of the five selections.

Figure 7F:
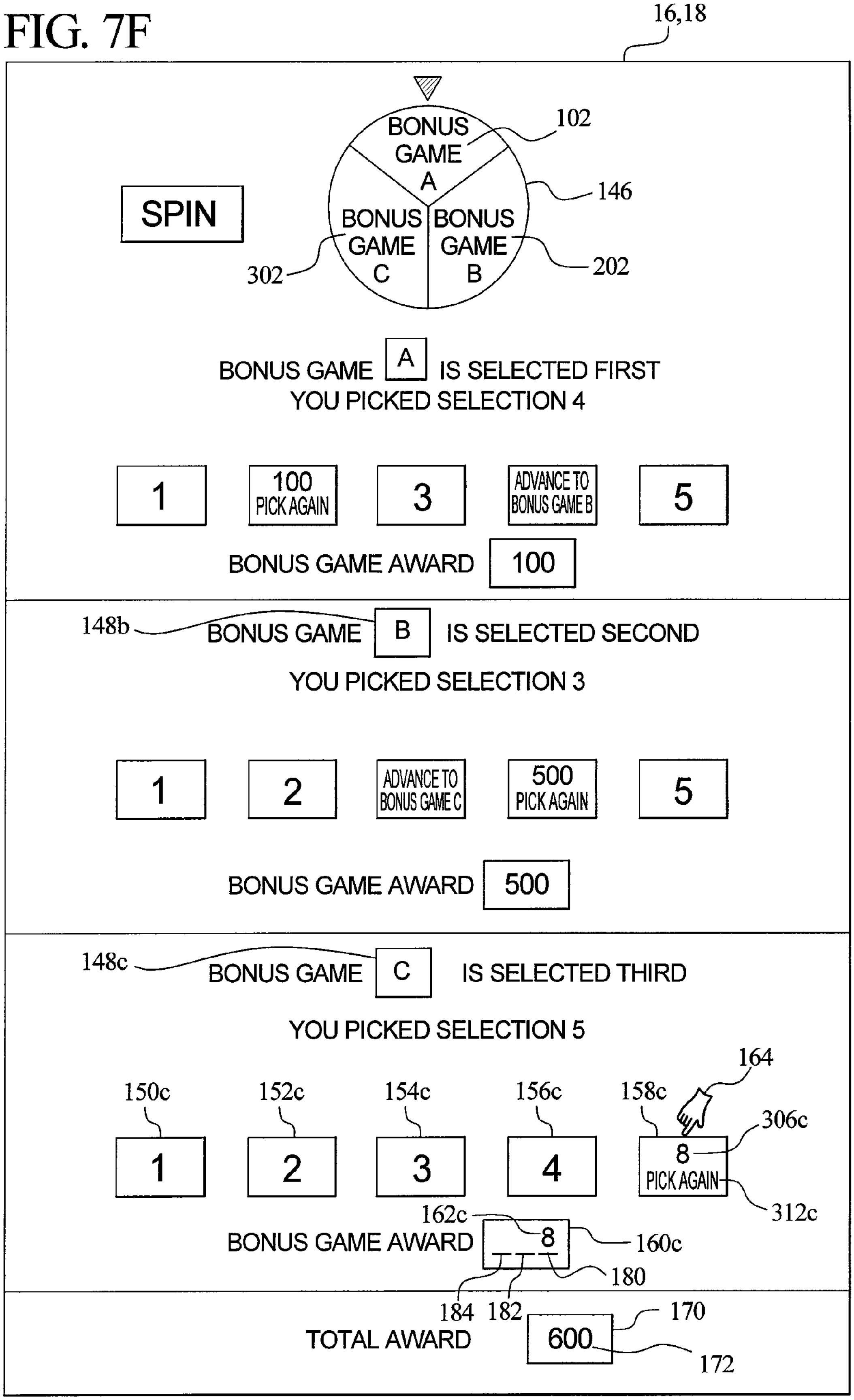

In FIG. 7F, the player picks selection 5. FIG. 7F illustrates the display device after the outcomes of selection 5 are revealed to the player. Selection 5 allows the player to receive an award digit 306*c* of eight and the opportunity to pick another selection 312*c*. The award digit 306*c*, eight, is preferably positioned in the one's position 180 of the bonus game award 160*c*. In an alternative embodiment, the digit is placed in another digit position and, in another alternative embodiment, the player selects the digit position for the digit. In this embodiment, knowing that another selection awaits the player, the player, may decide to risk that the next selection will reveal a digit of higher value that can be placed in a position of higher magnitude, i.e., the ten's 182 or hundred's 184 position.

Figure 7G:
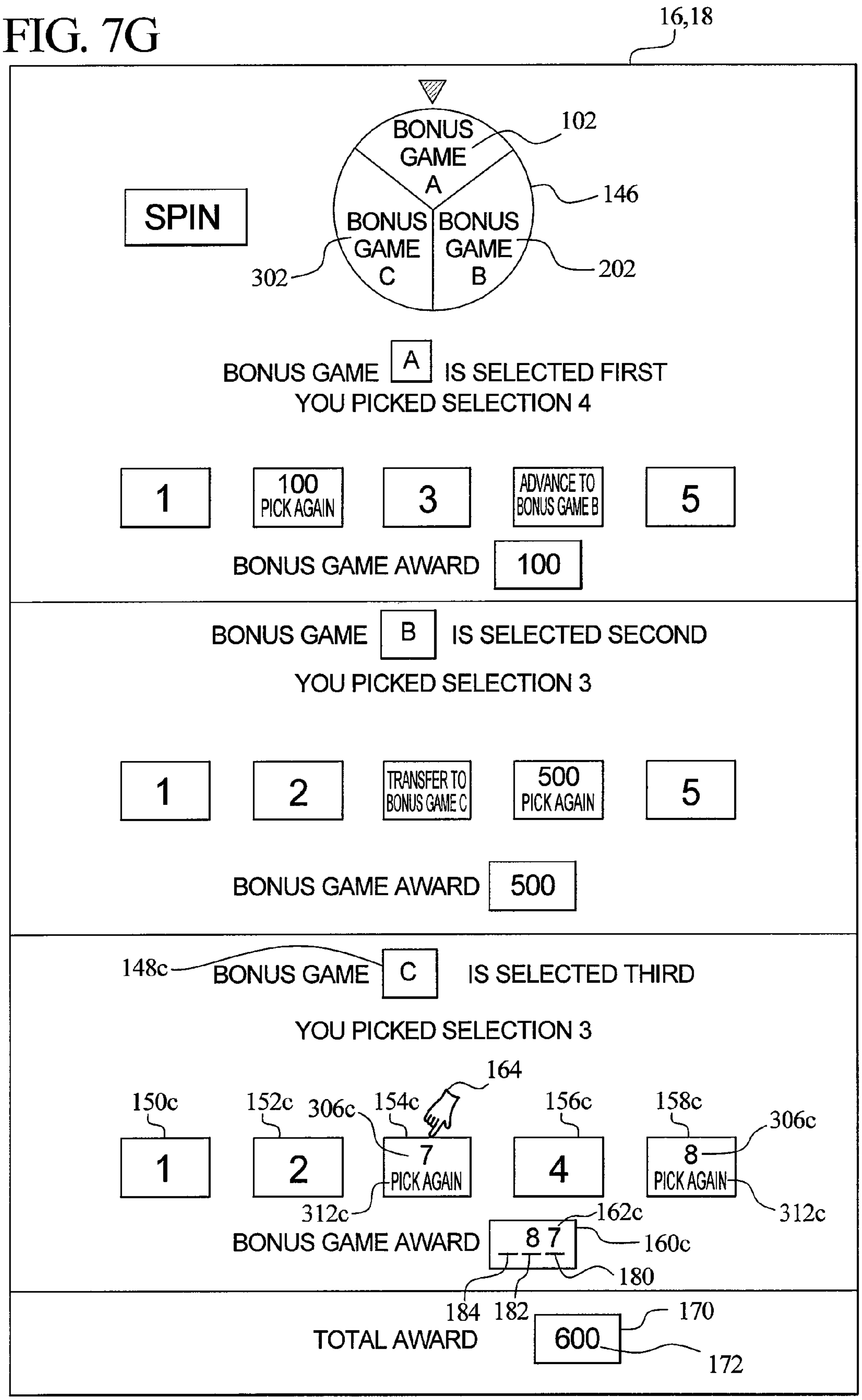

In FIG. 7G, the player picks selection 3. FIG. 7G illustrates the display after revealing to the player the outcome associated with the selection picked by the player in bonus game C. The gaming device provides the player an award digit 306*c* of seven which, in one embodiment, is positioned in the one's place 180 of the bonus game award. Concurrently, the eight from the previous selection is shifted to the ten's position 182 to create an award of eighty-seven 162*c*. The additional outcome 312*c* of selection 3 includes an opportunity for the player to pick another selection.

Figure 7H:
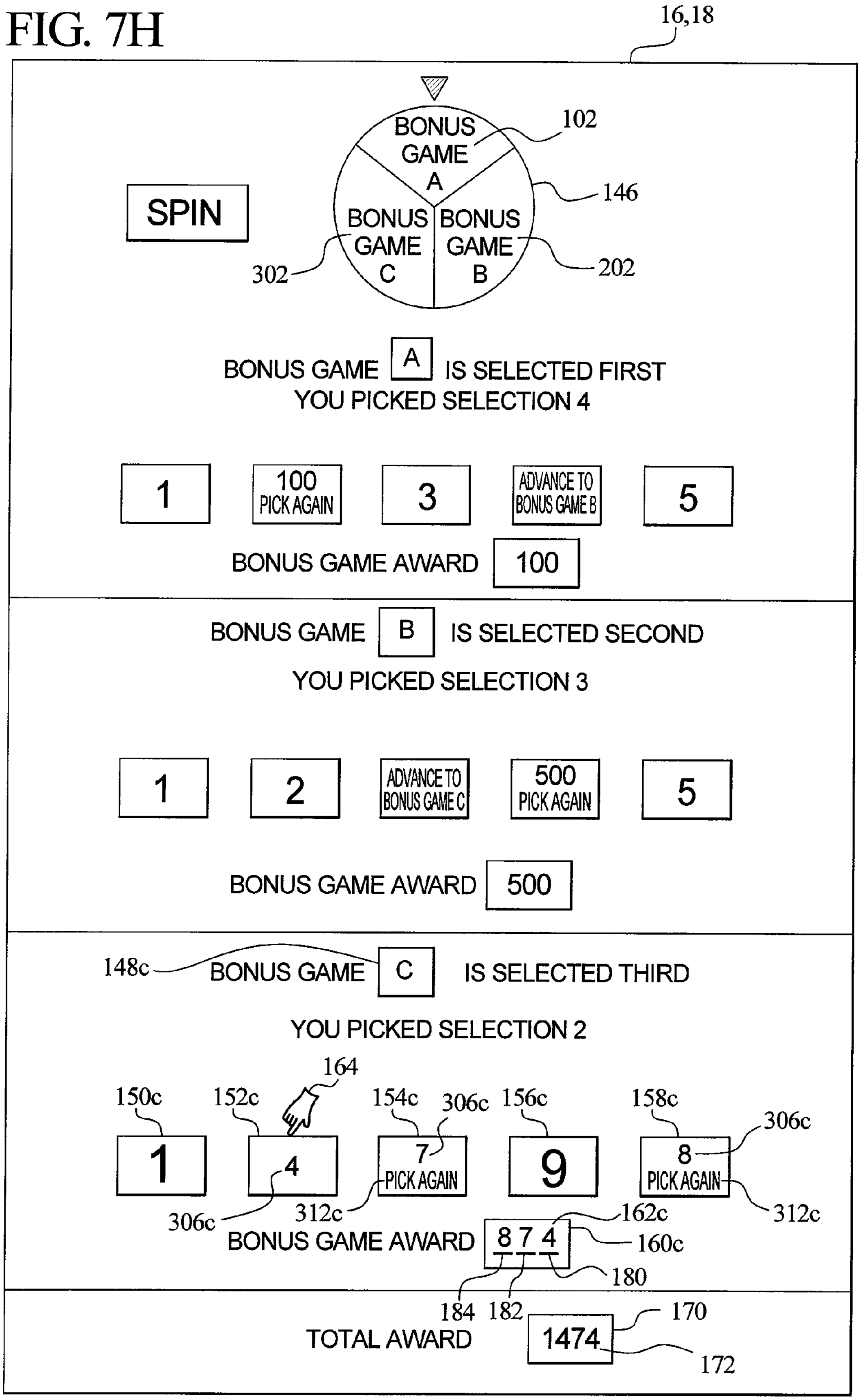

In FIG. 7H, the player picks selection 2. FIG. 7H illustrates the outcome associated with the player's third selection in bonus game C. The outcome of selection 2 is the award digit 306*c*, four, which is positioned in the one's position 180 of the bonus game award 162*c*. The eight and seven digits are shifted to the hundred's 184 and ten's 182 place, respectively, to create a bonus game award 162*c* of eight hundred seventy-four. There is no additional selection associated with the outcome of selection 2; therefore, bonus game C ends. Because the player has not been transferred to another bonus game, and there are no other bonus games to be played, the bonus award ends, and the player, in one embodiment, returns to the base game.

Figure 7I:
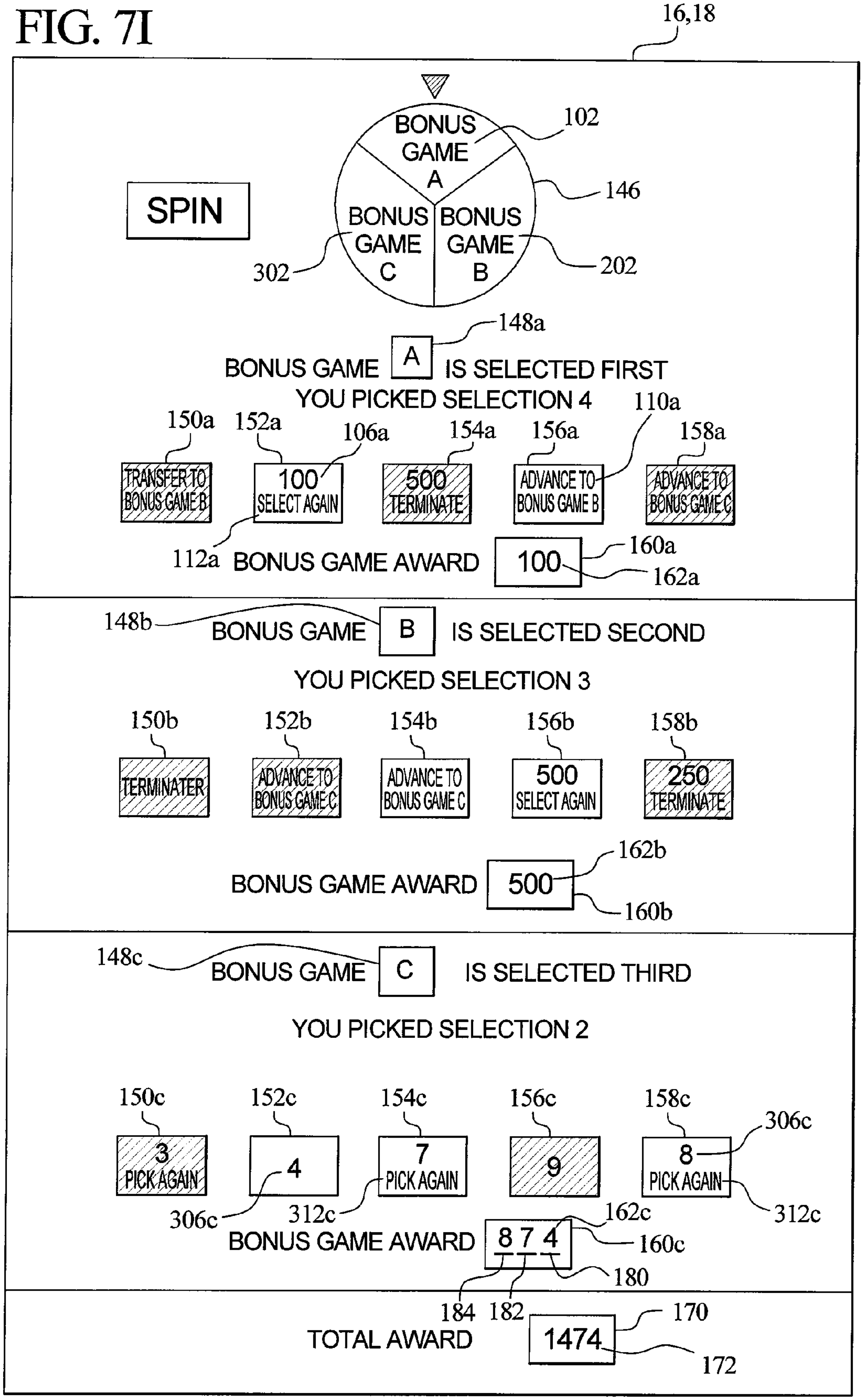

FIG. 7I illustrates the outcomes associated with the selections of the bonus games which were not selected by the player. It should be appreciated that multiple advances or transfers to other bonus games can be made associated with the selections of the bonus games as illustrated in FIG. 7I. In FIG. 7I, there are two selections in bonus game A that enable a player to advance to bonus game B. In one embodiment, the number of selections of a particular outcome is dependent upon the probability associated with that outcome. In the example of bonus game A illustrated in FIG. 7I, a 40% probability can be associated with the outcome advancing a player to bonus game B because there are two of five selections for that outcome based on a probability of 20% associated with each outcome. Hence, it should be appreciated that the probabilities for each outcome can be unequal or different.

Figure 8A:
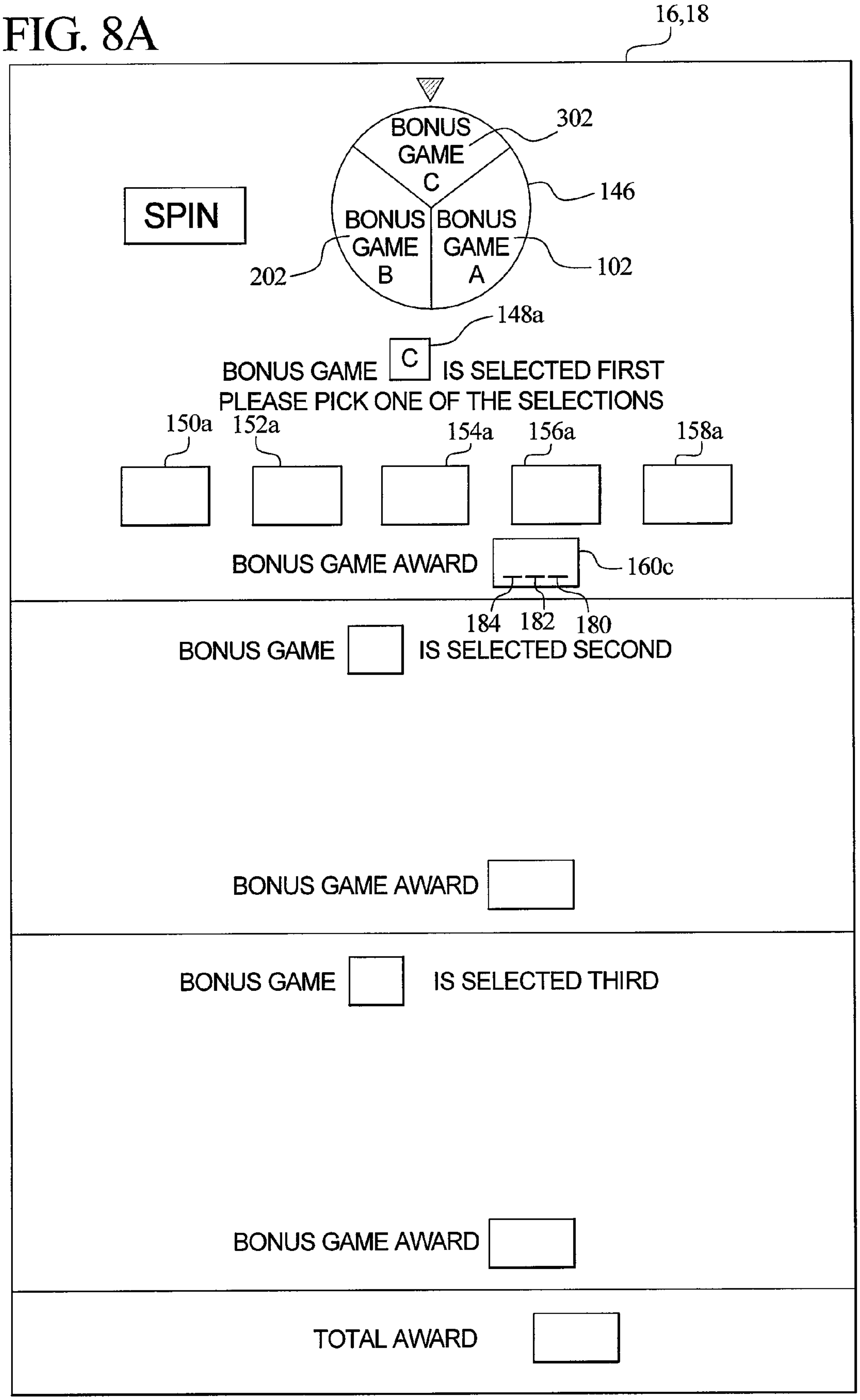
FIGS. 8A, 8B, 8C and 8D are front perspective views of the display of one embodiment of the present invention illustrating a scenario in which another bonus game is selected first wherein a player receives an award and an advance to a different bonus game.
Figure 8B:
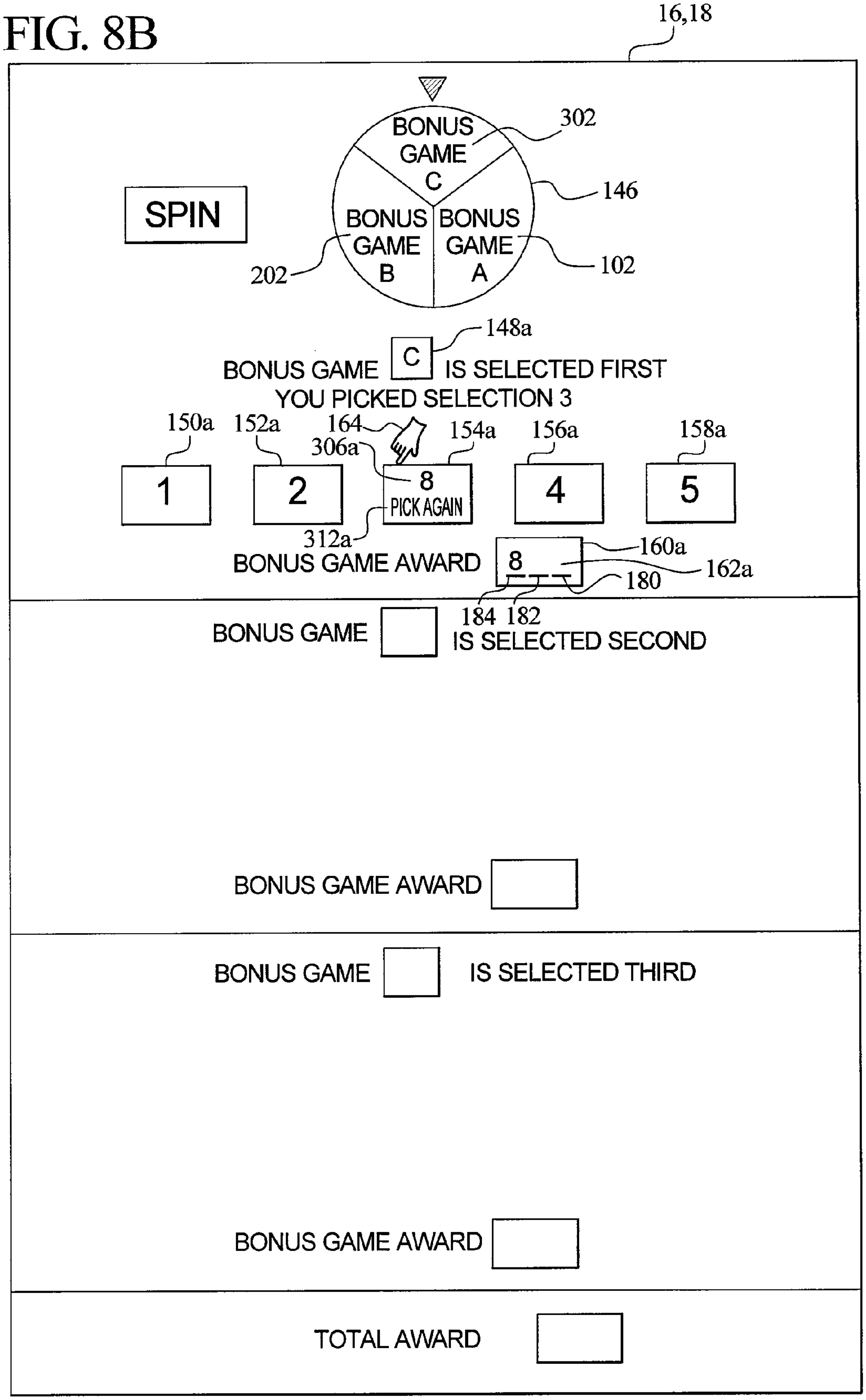
Figure 8C:
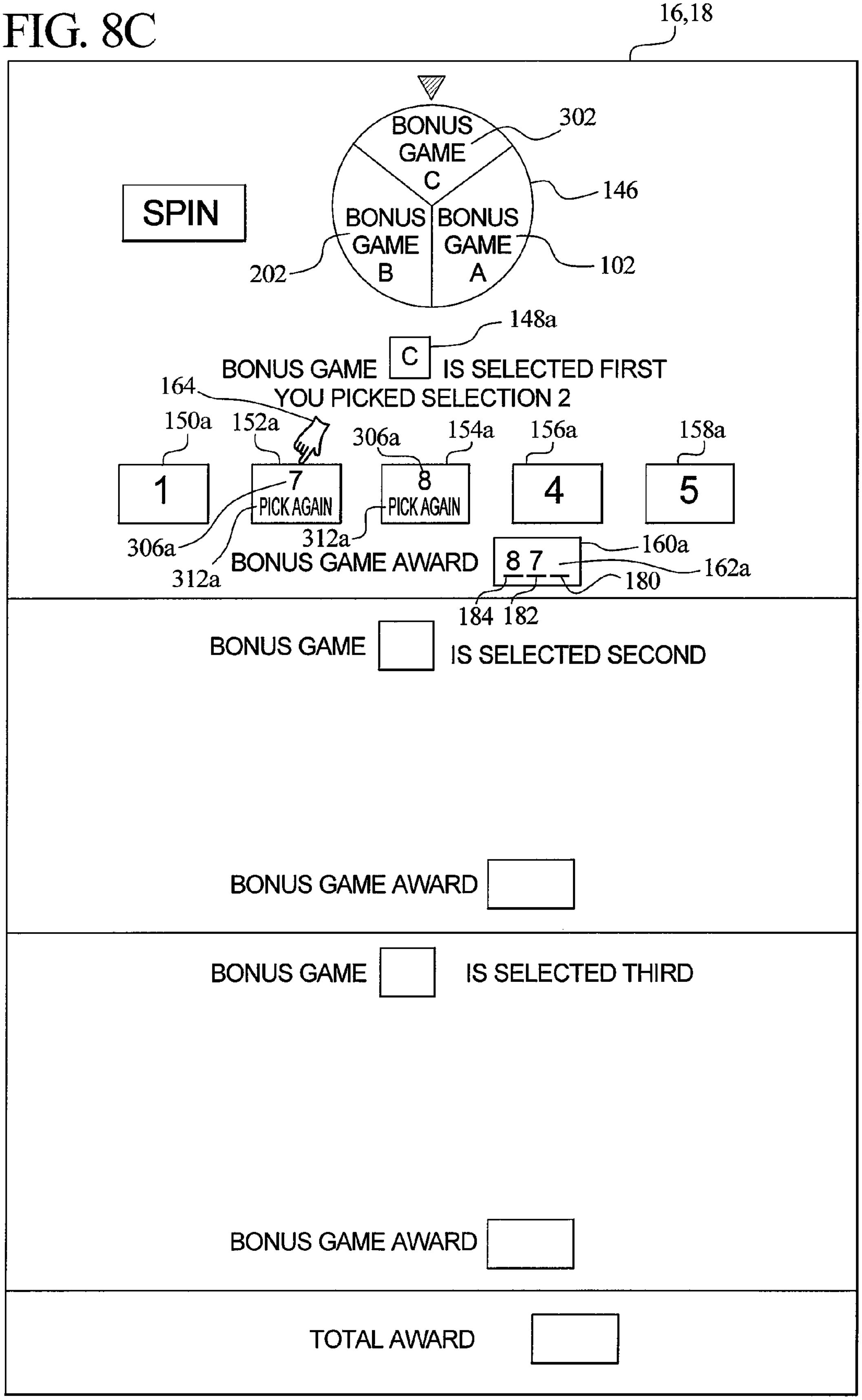
Figure 8D:
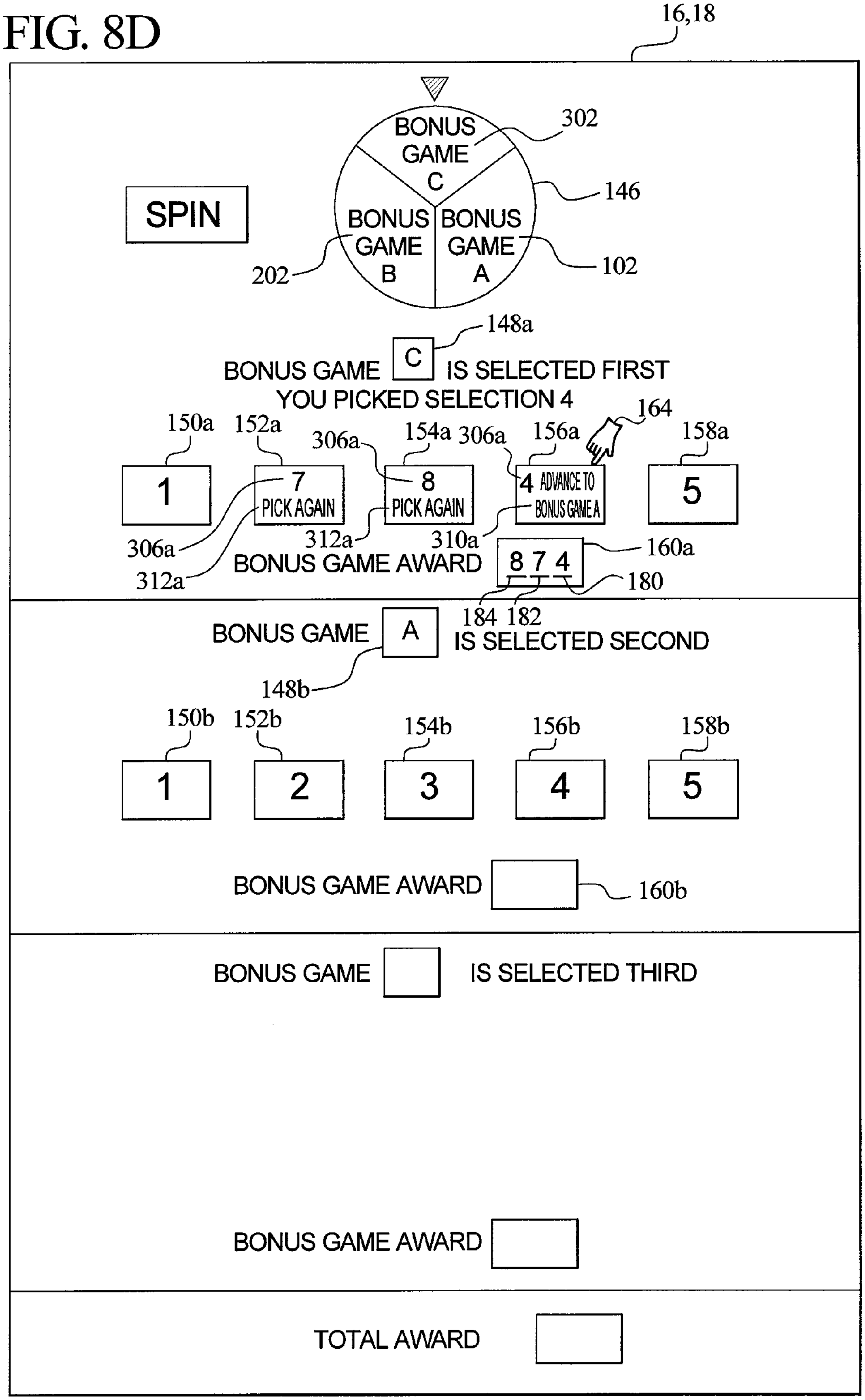

Referring now to FIGS. 8A to 8D, in another example of one of the embodiments of the present invention, bonus game C is the first game to be randomly selected by the gaming device. The outcomes associated with the selections presented to the player in bonus game C differ from the outcomes associated with the selections when the bonus game was the third or last selection. In FIG. 8A, five selections are displayed in bonus game C. The outcomes associated with the displayed selections according to FIG. 4C include a plurality of digits 306 In addition, the outcomes now include advances 310*a* to other bonus games. In FIG. 8B, the player picks selection 3. The outcome revealed to the player associated with selection 3 includes an award digit 306*a* of eight and an outcome 312*a* providing the opportunity to pick another selection. In the embodiment illustrated in FIG. 8B, the gaming device allows the player to select a digit position 180, 182 or 184 in the bonus game award display 160*a*. The award digit 306*a* provided to the player is placed in the digit position selected by the player. In FIG. 8B, the player selects the hundred's position 184 of the bonus award 162*a* for the award digit 306*a* eight. FIG. 8C illustrates the display 30, 32 after the player has picked another selection. The player picks selection 2 which again has two outcomes associated with the selection. The outcomes include an award digit 306*a* of seven and outcome 312*a* providing an opportunity for the player to pick another selection. The player elects to position the award digit 306*a* seven in the ten's position 182 of the bonus game award 162*a*. In FIG. 8D, the player picks selection 4. Selection 4 includes an award digit 306*a* of four and an advance 310*a* to bonus game A. In this embodiment, the award digit 306*a* is placed in the only remaining digit position, the one's position 180. The placement of the digits 306*a* in the digit positions 180, 182 and 184 of the bonus game award 162*a* yields an award 162*a* of eight hundred seventy-four for bonus game C. It should be appreciated that if the player had not received an additional digit for the one's position 180, the game would have in one embodiment used a predetermined number as a default such as zero. Alternatively, the game shifts the eight and seven from the hundred's 184 and ten's 182 positions to the ten's 182 and one's 180 position to yield a bonus game award 162*a* of eighty-seven.

The additional outcome associated with selection 4 includes an advance 310 to bonus game A. FIG. 8D illustrates a new set of selections associated with bonus game A available for the player to pick. Referring back to FIGS. 5A and 5B, the probability 334 that bonus game A is selected second when bonus game C has been selected first is 70%; therefore, the likelihood that bonus game A is selected is greater than the likelihood of bonus game B being selected when bonus game C is the first game to be selected.

It should be appreciated that a player's level of excitement is increased the opportunity to play a variety of bonus games by having the potential of accumulating multiple awards in these bonus games. In an alternative embodiment, the player is provided multiple award selections in a bonus game creating a higher probability of receiving an award in that bonus game. In one embodiment, the award provided to the player in a bonus game is transferred to the next bonus game where that award is potentially modified by the outcome of selections in other bonus games.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming device comprising:

at least one input device;

at least one display device;

at least one processor; and at least one memory device storing a plurality of instructions, which when executed by the at least one processor, cause the at least one processor to operate with the at least one input device and the at least one display device to:

(a) display a play of primary game upon a wager, (b) display a play of one of a plurality of bonus games as a first bonus game, wherein the plurality of bonus games are displayable in at least two different sequential orders, wherein the two different sequential orders both include each of the plurality of bonus games, and each of the plurality of bonus games include a plurality of different sets of outcomes, and (c) thereafter, display a play of another one of the bonus games as a second bonus game, wherein for each of the bonus games, the set of outcomes available to be provided to a player for the play of said bonus game is at least partly based on which of the at least two different sequential orders said bonus games are displayed.

2. The gaming device of claim 1, wherein the set of outcomes available to the player for each of said bonus games is based on the order said games are displayed.

3. The gaming device of claim 1, wherein at least one of the plurality of bonus games includes different probabilities associated with outcomes of said bonus game, wherein the probabilities used in the play of said bonus game is based on the order said bonus game is displayed.

4. The gaming device of claim 1, wherein at least one of the plurality of bonus games includes different functions associated with outcomes of said bonus game, wherein the functions employed in the play of said bonus game is based on the order said bonus game is displayed.

5. The gaming device of claim 1, wherein the first bonus game displayed is randomly determined.

6. The gaming device of claim 1, wherein the at least one outcome that is at least partly based on which of the at least two different sequential orders said bonus games are displayed is in the second bonus game.

7. A gaming system comprising:

at least one gaming machine; and at least one central controller configured to operate with the at least one gaming machine to:

cause the display of a play of a primary game upon a wager, cause the display of a play of one of a plurality of bonus games as a first bonus game, wherein the bonus games are displayable in at least two different sequential orders, wherein the two different sequential orders both include each of the plurality of bonus games, and each of the plurality of bonus games include a plurality of different sets of outcomes, and thereafter, cause the display of a play of another one of the bonus games as a second bonus game, wherein for each of the bonus games, the set of outcomes available to the player for the play of said bonus game is at least partly based on which of the at least two different sequential orders the bonus games are displayed.

8. The gaming system of claim 7, wherein the set of outcomes available to the player for each of said bonus games is based on the order said bonus games are displayed.

9. The gaming system of claim 7, wherein at least one of the plurality of bonus games includes different probabilities associated with outcomes of said bonus game, wherein the probabilities used in the play of said bonus game is based on the order said bonus game is displayed.

10. The gaming system of claim 7, wherein at least one of the plurality of bonus games includes different functions associated with outcomes of said bonus game, wherein the functions employed in the play of said bonus game is based on the order said bonus game is displayed.

11. The gaming system of claim 7, wherein the first bonus game displayed is randomly determined.

12. The gaming device of claim 7, wherein the at least one outcome that is at least partly based on which of the at least two different sequential orders said bonus games are displayed is in the second bonus game.

13. A method of operating a gaming system, said method comprising:

causing at least one display device to the display of a play of primary game upon a wager;

causing the at least one display device to display a play of one of a plurality of bonus games as a first bonus game, wherein the bonus games are displayable in at least two different sequential orders, wherein the two different sequential orders both include each of the plurality of bonus games, and each of the plurality of bonus games include a plurality of different sets of outcomes, and thereafter, causing the at least one display device to display a play of another one of the bonus games as a second bonus game, wherein for each of the bonus games, the set of outcomes available to be provided to a player for the play of said bonus game is at least partly based on which of the at least two different sequential orders the bonus games are displayed.

14. The method of claim 13, wherein the set of outcomes available to the player for each of said bonus games is based on the order said bonus games are displayed.

15. The method of claim 13, wherein at least one of the plurality of bonus games includes different probabilities associated with outcomes of said bonus game, wherein the probabilities used in the play of said bonus game is based on the order said bonus game is displayed.

16. The method of claim 13, wherein at least one of the plurality of bonus games includes different functions associated with the outcomes of said bonus game, wherein the functions employed in the play of said bonus game is based on the order said bonus game is displayed.

17. The method of claim 13, which includes randomly determining which bonus games is the first bonus game displayed.

18. The method of claim 13, which is provided through a data network.

19. The method of claim 18, wherein the data network is an internet.

* * * * *